(12) United States Patent
Gower et al.

(10) Patent No.: US 7,861,014 B2
(45) Date of Patent: Dec. 28, 2010

(54) SYSTEM FOR SUPPORTING PARTIAL CACHE LINE READ OPERATIONS TO A MEMORY MODULE TO REDUCE READ DATA TRAFFIC ON A MEMORY CHANNEL

(75) Inventors: Kevin C. Gower, LaGrangeville, NY (US); Warren E. Maule, Cedar Park, TX (US)

(73) Assignee: International Business Machines Corporation, Armonk, NY (US)

(*) Notice: Subject to any disclaimer, the term of this patent is extended or adjusted under 35 U.S.C. 154(b) by 472 days.

(21) Appl. No.: 11/848,312

(22) Filed: Aug. 31, 2007

(65) Prior Publication Data
US 2009/0063729 A1    Mar. 5, 2009

(51) Int. Cl.
*G06F 13/00* (2006.01)
(52) U.S. Cl. .............................. 710/35; 711/5; 711/154; 710/33
(58) Field of Classification Search ............ 711/5, 711/105, 154; 710/33, 35
See application file for complete search history.

(56) References Cited

U.S. PATENT DOCUMENTS

| | | | |
|---|---|---|---|
| 5,367,643 A | 11/1994 | Chang et al. | |
| 5,386,540 A | 1/1995 | Young et al. | |
| 5,513,135 A | 4/1996 | Dell et al. | |
| 5,598,113 A | 1/1997 | Jex et al. | |
| 5,640,349 A | 6/1997 | Kakinuma et al. | |
| 5,867,731 A | 2/1999 | Williams et al. | |
| 5,887,272 A | 3/1999 | Sartore et al. | |
| 5,896,404 A | 4/1999 | Kellogg et al. | |
| 6,049,476 A | 4/2000 | Laudon et al. | |

(Continued)

FOREIGN PATENT DOCUMENTS

WO    WO 99/49468    9/1999

OTHER PUBLICATIONS

Alghazo, Jaafar et al., "SF-LRU Cache Replacement Algorithm", Records of the 2004 International Workshop on Memory Technology, Design and Testing (MTDT), Aug. 2004, 6 pages.

(Continued)

*Primary Examiner*—Jasmine Song
(74) *Attorney, Agent, or Firm*—Francis Lammes; Stephen J. Walder, Jr.; Diana R. Gerhardt

(57) ABSTRACT

A memory system is provided that supports partial cache line read operations to a memory module to reduce read data traffic on a memory channel. The memory system comprises a memory hub device integrated in the memory module and a set of memory devices coupled to the memory hub device. The memory hub comprises burst logic integrated in the memory hub device. The burst logic determines an amount of read data to be transmitted from the set of memory devices and generates a burst length field corresponding to the amount of read data. The memory hub also comprises a memory hub controller integrated in the memory hub device. The memory hub controller controls the amount of read data that is transmitted using the burst length field. The memory hub device transmits the amount of read data that is equal to or less than a conventional data burst amount of data.

19 Claims, 6 Drawing Sheets

U.S. PATENT DOCUMENTS

| | | | |
|---|---|---|---|
| 6,095,827 A | 8/2000 | Dutkowsky et al. |
| 6,109,929 A | 8/2000 | Jasper |
| 6,141,728 A | 10/2000 | Simionescu et al. |
| 6,263,448 B1 | 7/2001 | Tsern et al. |
| 6,279,072 B1 | 8/2001 | Williams et al. |
| 6,285,622 B1 | 9/2001 | Haraguchi et al. |
| 6,356,500 B1 | 3/2002 | Cloud et al. |
| 6,397,287 B1 | 5/2002 | Brown et al. |
| 6,397,290 B1 | 5/2002 | Williams et al. |
| 6,401,149 B1 | 6/2002 | Dennin et al. |
| 6,415,349 B1 | 7/2002 | Hull et al. |
| 6,418,068 B1 | 7/2002 | Raynham |
| 6,477,614 B1 | 11/2002 | Leddige et al. |
| 6,507,887 B1 | 1/2003 | Pontius et al. |
| 6,512,644 B1 | 1/2003 | Hall et al. |
| 6,584,543 B2 | 6/2003 | Williams et al. |
| 6,683,372 B1 | 1/2004 | Wong et al. |
| 6,721,864 B2 | 4/2004 | Keskar et al. |
| 6,785,837 B1 | 8/2004 | Kilmer et al. |
| 6,789,169 B2 | 9/2004 | Jeddeloh |
| 6,821,144 B2 | 11/2004 | Choy |
| 6,822,960 B1 | 11/2004 | Manchester et al. |
| 6,848,060 B2 | 1/2005 | Cook et al. |
| 6,889,284 B1 | 5/2005 | Nizar et al. |
| 6,910,145 B2 | 6/2005 | MacLellan et al. |
| 6,938,119 B2 | 8/2005 | Kohn et al. |
| 6,952,745 B1 | 10/2005 | Dodd et al. |
| 6,961,281 B2 | 11/2005 | Wong et al. |
| 6,982,892 B2 | 1/2006 | Lee et al. |
| 7,043,611 B2 | 5/2006 | McClannahan et al. |
| 7,054,179 B2 | 5/2006 | Cogdill et al. |
| 7,103,730 B2 | 9/2006 | Saxena et al. |
| 7,111,143 B2 | 9/2006 | Walker |
| 7,114,117 B2 | 9/2006 | Tamura et al. |
| 7,117,328 B2 | 10/2006 | Shibuya et al. |
| 7,120,727 B2 | 10/2006 | Lee et al. |
| 7,124,332 B2 | 10/2006 | Constantinescu |
| 7,133,972 B2 | 11/2006 | Jeddeloh |
| 7,143,246 B2 | 11/2006 | Johns |
| 7,162,669 B2 | 1/2007 | Gross |
| 7,200,021 B2 | 4/2007 | Raghuram |
| 7,200,023 B2 | 4/2007 | Foster, Sr. |
| 7,203,874 B2 | 4/2007 | Roohparvar |
| 7,210,015 B2 | 4/2007 | Barth et al. |
| 7,216,196 B2 | 5/2007 | Jeddeloh |
| 7,225,303 B2 | 5/2007 | Choi |
| 7,234,099 B2 | 6/2007 | Gower et al. |
| 7,269,042 B2 | 9/2007 | Kinsley et al. |
| 7,272,070 B2 | 9/2007 | Hummler |
| 7,490,209 B1 | 2/2009 | Charagulla |
| 7,558,124 B2 | 7/2009 | Wu et al. |
| 7,558,887 B2 | 7/2009 | Gower et al. |
| 7,577,039 B2 | 8/2009 | Yang et al. |
| 7,584,308 B2 | 9/2009 | Gower et al. |
| 7,770,077 B2 | 8/2010 | Arimilli et al. |
| 2002/0112119 A1 | 8/2002 | Halbert et al. |
| 2003/0037280 A1 | 2/2003 | Berg et al. |
| 2003/0061447 A1 | 3/2003 | Perego et al. |
| 2003/0097526 A1 | 5/2003 | Chiu et al. |
| 2003/0137862 A1 | 7/2003 | Brunelle et al. |
| 2004/0006674 A1 | 1/2004 | Hargis et al. |
| 2004/0024971 A1 | 2/2004 | Bogin et al. |
| 2004/0109468 A1 | 6/2004 | Anjanaiah |
| 2004/0117566 A1 | 6/2004 | McClannahan et al. |
| 2004/0128464 A1 | 7/2004 | Lee et al. |
| 2004/0213074 A1 | 10/2004 | Johnson et al. |
| 2004/0236877 A1 | 11/2004 | Burton |
| 2005/0033921 A1 | 2/2005 | Jeddeloh |
| 2005/0050255 A1 | 3/2005 | Jeddeloh et al. |
| 2005/0125702 A1 | 6/2005 | Huang et al. |
| 2005/0138267 A1 | 6/2005 | Bains et al. |
| 2005/0138302 A1 | 6/2005 | Lusk et al. |
| 2005/0160250 A1 | 7/2005 | Yoshimi |
| 2005/0216677 A1 | 9/2005 | Jeddeloh et al. |
| 2005/0223161 A1 | 10/2005 | Jeddeloh et al. |
| 2006/0095592 A1 | 5/2006 | Borkenhagen |
| 2006/0117322 A1 | 6/2006 | Gimness et al. |
| 2006/0123261 A1 | 6/2006 | Riley et al. |
| 2006/0158917 A1 | 7/2006 | Bartley et al. |
| 2006/0168407 A1 | 7/2006 | Stern |
| 2006/0179262 A1 | 8/2006 | Brittain et al. |
| 2006/0212775 A1 | 9/2006 | Cypher |
| 2006/0235901 A1 | 10/2006 | Chan |
| 2006/0245226 A1 | 11/2006 | Stewart |
| 2006/0271755 A1 | 11/2006 | Miura |
| 2006/0288132 A1 | 12/2006 | McCall et al. |
| 2007/0005922 A1 | 1/2007 | Swaminathan et al. |
| 2007/0011392 A1 | 1/2007 | Lee et al. |
| 2007/0011562 A1 | 1/2007 | Alexander et al. |
| 2007/0016718 A1 | 1/2007 | Radhakrishnan et al. |
| 2007/0033317 A1 | 2/2007 | Jeddeloh et al. |
| 2007/0050530 A1 | 3/2007 | Rajan |
| 2007/0098020 A1 | 5/2007 | Ja et al. |
| 2007/0106860 A1 | 5/2007 | Foster et al. |
| 2007/0111606 A1 | 5/2007 | Goodwin |
| 2007/0150672 A1 | 6/2007 | Alexander et al. |
| 2007/0162648 A1 | 7/2007 | Tousek |
| 2007/0162654 A1 | 7/2007 | Miwa |
| 2007/0230230 A1 | 10/2007 | Hofstra |
| 2007/0260841 A1 | 11/2007 | Hampel et al. |
| 2008/0031030 A1 | 2/2008 | Rajan et al. |
| 2008/0046666 A1 | 2/2008 | Termaine |
| 2008/0170425 A1 | 7/2008 | Rajan |
| 2008/0215792 A1 | 9/2008 | Jeddeloh |
| 2008/0270741 A1 | 10/2008 | Tremaine |
| 2009/0019195 A1 | 1/2009 | Djordjevic |
| 2009/0063730 A1 | 3/2009 | Gower et al. |
| 2009/0063731 A1 | 3/2009 | Gower et al. |
| 2009/0063761 A1 | 3/2009 | Gower et al. |
| 2009/0063784 A1 | 3/2009 | Gower et al. |
| 2009/0063785 A1 | 3/2009 | Gower et al. |
| 2009/0063787 A1 | 3/2009 | Gower et al. |
| 2009/0063922 A1 | 3/2009 | Gower et al. |
| 2009/0063923 A1 | 3/2009 | Gower et al. |
| 2009/0125788 A1 | 5/2009 | Wheeler et al. |
| 2009/0190427 A1 | 7/2009 | Brittain et al. |
| 2009/0190429 A1 | 7/2009 | Brittain et al. |
| 2009/0193200 A1 | 7/2009 | Brittain et al. |
| 2009/0193201 A1 | 7/2009 | Brittain et al. |
| 2009/0193203 A1 | 7/2009 | Brittain et al. |
| 2009/0193290 A1 | 7/2009 | Arimilli et al. |
| 2009/0193315 A1 | 7/2009 | Gower et al. |

OTHER PUBLICATIONS

Delaluz, V. et al., "Scheduler-Based DRAM Energy Management", Proceedings of the 2002 Design Automation Conference (IEEE Cat. No. 02CH37324), Jun. 2002, pp. 697-702.

Huang, Hai et al., "Improving Energy Efficiency by Making DRAM Less Randomly Accessed", Proceedings of the 2005 International Symposium on Low Power Electronics and Design (IEEE Cat. No. 05th 8842), Aug. 2005, pp. 393-398.

Huang, Hai et al., "Method and System for Decreasing Power Consumption in Memory Array", Jul. 2005, 5 pages.

Park, Jin H. et al., "Coarse Grained Power Management", Proceedings of the International Conference on Embedded Systems and Applications, ESA, 2003, pp. 248-254.

Nasr, Rami Marwan, "FBSIM and the Fully Buffered DIMM Memory System Architecture", Thesis, 2005, 138 pages.

Lin et al., "DRAM-Level Prefetching for Fully-Buffered DIMM: Design, Performance and Power Saving", ISPASS, 2007, pp. 1-36.

"Quad-Core and Dual-Core Intel Xeon Processor-based Two-Processor Workstations", Intel, see "fully buffered DIMM technology", Oct. 5, 2006, p. 8.

John, Lizy Kurian, "VaWiRAM: A Variable Width Random Access Memory Module", 9th International Conference on VLSI Design, Jan. 1996, pp. 219-224.

Woodacre et al., "The SGI Altix 3000 Global Shared-Memory Architecture", Silicon Graphics, Incorporated, White Paper, 2003.

Haas et al., "Fully-Buffered DIMM Technology Moves Enterprise Platforms to the Next Level", Technology @ Intel Magazine, Mar. 2005, pp. 1-7.

Arimilli et al., "Asynchronous Generation of DRAM Controls from Micro Channel Signals", IBM Technical Disclosure, No. 6, 1992, p. 372.

Howell, J.H., "Dual-Port Control Signal Generator", IBM Technical Disclosure, 1988, pp. 102-104.

Karp et al., "Clock Synchronization Method Speeds Processor Access to Memory", IBM Technical Disclosure, yvol. 38, No. 11, 1995, pp. 7-8.

U.S. Appl. No. 11/613,363, filed Dec. 20, 2006, Pham et al.
U.S. Appl. No. 11/848,309, filed Aug. 31, 2007, Gower et al.
U.S. Appl. No. 11/850,190, filed Sep. 5, 2007, Gower et al.
U.S. Appl. No. 11/850,290, filed Sep. 5, 2007, Gower et al.
U.S. Appl. No. 11/848,318, filed Aug. 31, 2007, Gower et al.
U.S. Appl. No. 11/848,322, filed Aug. 31, 2007, Gower et al.
U.S. Appl. No. 11/848,335, filed Aug. 31, 2007, Gower et al.
U.S. Appl. No. 11/848,342, filed Aug. 31, 2007, Gower et al.
U.S. Appl. No. 11/848,349, filed Aug. 31, 2007, Gower et al.
U.S. Appl. No. 11/850,353, filed Sep. 5, 2007, Gower et al.
U.S. Appl. No. 11/848,354, filed Aug. 31, 2007, Gower et al.
U.S. Appl. No. 12/018,926, filed Jan. 24, 2008, Gower et al.
U.S. Appl. No. 12/019,071, filed Jan. 24, 2008, Brittain et al.
U.S. Appl. No. 12/019,043, filed Jan. 24, 2008, Brittain et al.
U.S. Appl. No. 12/019,095, filed Jan. 24, 2008, Brittain et al.
U.S. Appl. No. 12/018,952, filed Jan. 24, 2008, Brittain et al.
U.S. Appl. No. 12/019,141, filed Jan. 24, 2008, Arimilli et al.
U.S. Appl. No. 12/018,972, filed Jan. 24, 2008, Brittain et al.
USPTO U.S. Appl. No. 11/848,309, Image File Wrapper printed May 19, 2010, 3 pages.
USPTO U.S. Appl. No. 11/848,322, Image File Wrapper printed on May 19, 2010, 3 pages.
USPTO U.S. Appl. No. 11/848,335, Image File Wrapper printed on May 19, 2010, 3 pages.
USPTO U.S. Appl. No. 11/848,342, Image File Wrapper printed on May 19, 2010, 3 pages.
USPTO U.S. Appl. No. 11/848,349, Image File Wrapper printed on May 19, 2010, 2 pages.
USPTO U.S. Appl. No. 11/848,354, Image File Wrapper printed on May 19, 2010, 2 pages.
USPTO U.S. Appl. No. 11/850,190, Image File Wrapper printed on May 19, 2010, 2 pages.
USPTO U.S. Appl. No. 11/850,290, Image File Wrapper printed on May 19, 2010, 2 pages.
USPTO U.S. Appl. No. 11/850,353, Image File Wrapper printed on May 19, 2010, 2 pages.
USPTO U.S. Appl. No. 12/018,926, Image File Wrapper printed on May 19, 2010, 2 pages.
USPTO U.S. Appl. No. 12/018,952, Image File Wrapper printed on May 19, 2010, 2 pages.
USPTO U.S. Appl. No. 12/018,972, Image File Wrapper printed on May 19, 2010, 3 pages.
USPTO U.S. Appl. No. 12/019,043, Image File Wrapper printed on May 19, 2010, 2 pages.
USPTO U.S. Appl. No. 12/019,071, Image File Wrapper printed on May 19, 2010, 2 pages.
USPTO U.S. Appl. No. 12/019,095, Image File Wrapper printed on May 19, 2010, 2 pages.
USPTO U.S. Appl. No. 12/019,141, Image File Wrapper printed on May 19, 2010, 4 pages.
USPTO U.S. Appl. No. 11/848,318, Image File Wrapper printed on May 19, 2010, 3 pages.
Final Office Action mailed Jul. 2, 2010 U.S. Appl. No. 11/848,335; 17 pages.
Interview Summary mailed Jun. 1, 2010 U.S. Appl. No. 11/848,309; 3 pages.
Notice of Allowance mailed Jun. 10, 2010 for U.S. Appl. No. 11/848,322; 10 pages.
Response to Office Action filed Jun. 3, 2010 for U.S. Appl. No. 11/848,309; 19 pages.
Notice of Allowance mailed Jul. 15, 2010 for U.S. Appl. No. 11/848,318; 9 pages.
Notice of Allowance mailed Aug. 6, 2010 for U.S. Appl. No. 11/848,335; 5 pages.
Notice of Allowance mailed Aug. 19, 2010 for U.S. Appl. No. 11/848,309; 15 pages.
Office Action mailed Aug. 31, 2010 for U.S. Appl. No. 12/019,071; 22 pages.
Office Action mailed Aug. 31, 2010 for U.S. Appl. No. 12/019,095; 21 pages.
Office Action mailed Sep. 1, 2010 for U.S. Appl. No. 12/019,043; 21 pages.
Office Action mailed Sep. 2, 2010 for U.S. Appl. No. 12/018,952; 21 pages.
Office Action mailed Sep. 29, 2010 for U.S. Appl. No. 12/018,972; 27 pages.

SYSTEM FOR SUPPORTING PARTIAL CACHE LINE READ OPERATIONS TO A MEMORY MODULE TO REDUCE READ DATA TRAFFIC ON A MEMORY CHANNEL

GOVERNMENT RIGHTS

This invention was made with Government support under DARPA, HR0011-07-9-0002. THE GOVERNMENT HAS CERTAIN RIGHTS IN THIS INVENTION.

BACKGROUND

1. Technical Field

The present application relates generally to an improved data processing system and method. More specifically, the present application is directed to a system for supporting partial cache line read operations to a memory module to reduce read data traffic on a memory channel.

2. Description of Related Art

Contemporary high performance computing main memory systems are generally composed of one or more dynamic random access memory (DRAM) devices, which are connected to one or more processors via one or more memory control elements. Overall computer system performance is affected by each of the key elements of the computer structure, including the performance/structure of the processor(s), any memory cache(s), the input/output (I/O) subsystem(s), the efficiency of the memory control function(s), the main memory device(s), and the type and structure of the memory interconnect interface(s).

Extensive research and development efforts are invested by the industry, on an ongoing basis, to create improved and/or innovative solutions to maximizing overall system performance and density by improving the memory system/sub-system design and/or structure. High-availability systems, i.e. systems that must be available to users without failure for large periods of time, present further challenges related to overall system reliability due to customer expectations that new computer systems will markedly surpass existing systems with regard to mean-time-before-failure (MTBF), in addition to offering additional functions, increased performance, increased storage, lower operating costs, etc. Other frequent customer requirements further exacerbate the memory system design challenges, and include such items as ease of upgrade and reduced system environmental impact, such as space, power, and cooling.

Furthermore, with the movement to multi-core and multi-threaded processor designs, new requirements are being made for the memory subsystem to supply very large data bandwidths and memory capacity into a single processor memory module socket. At a system level, the bandwidth and memory capacity available from the memory subsystem is directly proportional to the number of memory modules that can be supported by the processor pin counts, the frequency at which the processor pins operate, and how efficiently the processor pins are used to transfer data. That is, the memory modules connect to the processor through a memory interface bus and memory module sockets, which may also be called a memory channel. The memory module sockets are comprised of pins that connect to the pins located on a common edge of a memory module. Thus, the number of pins or pin count of the memory modules and the pin count of the memory module's sockets, which are connected to the processor, defines the bandwidth and memory capacity of the memory system.

For high bandwidth memory systems, multiple hub based memory modules and/or multi-ported hub based memory modules may be used in the memory system to generate bandwidth to fill up the high bandwidth memory channel. With a memory system that uses multiple hub based memory modules and/or multi-ported hub based memory modules, the total amount of bandwidth that is available on the memory modules may be significantly higher than the bandwidth available on the memory channel. Thus, the memory channel presents a limiting factor, or bottleneck, for the flow of data to/from the memory modules of a memory system.

SUMMARY

In order to increase the available bandwidth of a memory channel, the illustrative embodiments reduce the amount of bandwidth used during reading and writing of data from and to the memory system. Typically, when accessing data from a memory system using a cache mechanism, data transfers are performed in terms of entire cache lines even if the amount of data required by the read or write operation is only a sub-portion of the cache line. Thus, some data is transferred across the memory channel which is simply discarded. As a result, bandwidth is consumed by data traffic which contains data that is not used and hence, bandwidth is wasted in transferring this data.

The illustrative embodiments provide mechanisms for increasing the usable bandwidth of a memory system. One illustrative embodiment provides for supporting partial cache line read operations to a memory module to reduce read data traffic on the memory channel. Another illustrative embodiment provides for supporting partial cache line write operations to a memory module to reduce write data traffic on the memory channel. A further illustrative embodiment provides for increasing the available bandwidth on the memory channel by managing memory device error correction within a memory hub device. Yet another illustrative embodiment provides for a variable width memory device data interface to memory devices that allows additional error correction capability at the memory device level that is transparent to the memory channel.

The illustrative embodiments provide a memory system that comprises a memory hub device integrated in a memory module and a set of memory devices coupled to the memory hub device. In the illustrative embodiments, the memory hub device comprises burst logic integrated in the memory hub device. In the illustrative embodiments, the burst logic determines an amount of read data to be transmitted from the set of memory devices and generates a burst length field corresponding to the amount of read data. In the illustrative embodiments, the memory hub device also comprises a memory hub controller integrated in the memory hub device. In the illustrative embodiments, the memory hub controller controls the amount of read data that is transmitted using the burst length field and wherein the memory hub device transmits the amount of read data on a memory channel. In the illustrative embodiments, the amount of read data is equal to or less than a conventional data burst amount of data for the set of memory devices.

In the illustrative embodiments, the memory hub device may further comprise a memory device data interface coupled to the memory hub controller and the set of memory devices. In the illustrative embodiments, the memory hub controller may control the amount of read data that is transmitted using the burst length field by sending one or more control signals to the memory device data interface to thereby control an amount of data output by the memory device data interface. In the illustrative embodiments, the memory hub device may further comprise a link interface, coupled to the memory device data interface and the memory hub controller. In the illustrative embodiments, the link interface may provide a communication path between the memory module and an external memory controller. In the illustrative embodiments, the memory hub controller may control the transfer of data between the memory device data interface and the link interface.

In the illustrative embodiments, the memory hub device may further comprise a multiplexer coupled to the link interface and the memory device data interface. In the illustrative embodiments, the memory hub device may further comprise a read data queue coupled to the multiplexer and the memory device data interface. In the illustrative embodiments, the memory hub controller may control the transfer of data between the memory device data interface and the link interface by sending one or more control signals to the multiplexer to select either a direct input from the memory device data interface or an input from the read data queue for output by the multiplexer to the link interface.

In the illustrative embodiments, the memory hub controller may control the output of data from the link interface to the external memory controller by providing a control signal specifying an amount of data provided to the link interface, and a start of the data. In the illustrative embodiments, the memory hub controller may send a control signal to the multiplexer to select the input from the read data queue based on a state of the read data queue and a state of the link interface.

In the illustrative embodiments, the burst length field may specify one of a full burst amount of data, a half burst amount of data, or a quarter burst amount of data. In the illustrative embodiments, a smallest amount of read data that may be specified in the burst length field may be dependent upon an error correction code codeword. In the illustrative embodiments, in response to receiving a read access request, the memory hub controller may forward the read access request to the set of memory devices. Also, in response to receiving a read access request, the illustrative embodiments may receive a first portion of read data having an amount of data equal to the conventional data burst amount of data from the set of memory devices. In the illustrative embodiments, the memory hub controller may select, based on the burst length field, a second portion of the read data having a smaller amount of data than the first portion of read data.

In the illustrative embodiments, the memory module may be one of a dual in-line memory module (DIMM) or a single in-line memory module (SIMM). In the illustrative embodiments, the memory module may be part of a data processing device. In the illustrative embodiments, the memory module may be part of a main memory of a data processing system.

These and other features and advantages of the present invention will be described in, or will become apparent to those of ordinary skill in the art in view of, the following detailed description of the exemplary embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION OF THE
ILLUSTRATIVE EMBODIMENTS

Figure 1:
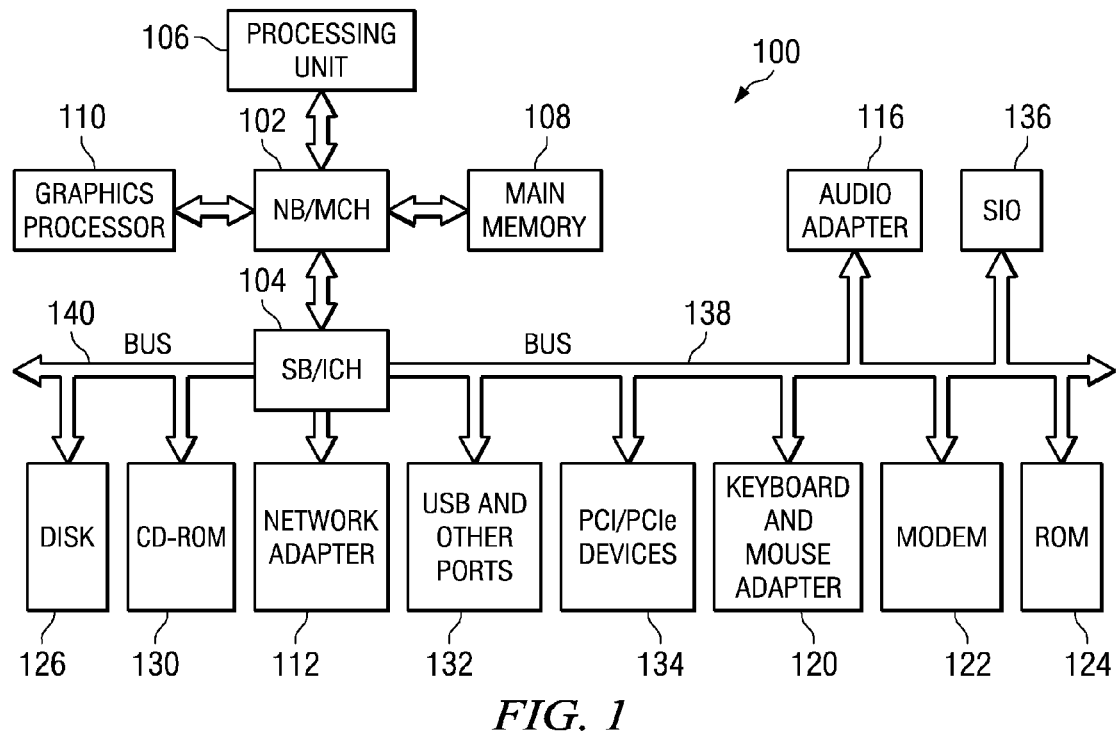
FIG. 1 is a block diagram of an exemplary data processing system in which aspects of the illustrative embodiments may be implemented.

The illustrative embodiments provide mechanisms for enhancing the memory bandwidth available through a buffered memory module. As such, the mechanisms of the illustrative embodiments may be used with any of a number of different types of data processing devices and environments. For example, the memory system of the illustrative embodiments may be utilized with data processing devices such as servers, client data processing systems, stand-alone data processing systems, or any other type of data processing device. Moreover, the memory systems of the illustrative embodiments may be used in other electronic devices in which memories are utilized including printers, facsimile machines, storage devices, flash drives, or any other electronic device in which a memory is utilized. In order to provide a context for the description of the mechanisms of the illustrative embodiments, and one example of a device in which the illustrative embodiments may be implemented, FIG. 1 is provided hereafter as an exemplary diagram of data processing environment in which embodiments of the present invention may be implemented. It should be appreciated that FIG. 1 is only exemplary and is not intended to assert or imply any limitation with regard to the environments in which aspects or embodiments of the present invention may be implemented. Many modifications to the depicted environments may be made without departing from the spirit and scope of the present invention.

With reference now to FIG. 1, a block diagram of an exemplary data processing system is shown in which aspects of the illustrative embodiments may be implemented. Data processing system 100 is an example of a computer in which computer usable code or instructions implementing the processes for illustrative embodiments of the present invention may be located.

In the depicted example, data processing system 100 employs a hub architecture including north bridge and memory controller hub (NB/MCH) 102 and south bridge and input/output (I/O) controller hub (SB/ICH) 104. Processing unit 106, main memory 108, and graphics processor 110 are connected to NB/MCH 102. Graphics processor 110 may be connected to NB/MCH 102 through an accelerated graphics port (AGP).

In the depicted example, local area network (LAN) adapter 112 connects to SB/ICH 104. Audio adapter 116, keyboard and mouse adapter 120, modem 122, read only memory (ROM) 124, hard disk drive (HDD) 126, CD-ROM drive 130, universal serial bus (USB) ports and other communication ports 132, and PCI/PCIe devices 134 connect to SB/ICH 104 through bus 138 and bus 140. PCI/PCIe devices may include, for example, Ethernet adapters, add-in cards, and PC cards for notebook computers. PCI uses a card bus controller, while PCIe does not. ROM 124 may be, for example, a flash binary input/output system (BIOS).

HDD 126 and CD-ROM drive 130 connect to SB/ICH 104 through bus 140. HDD 126 and CD-ROM drive 130 may use, for example, an integrated drive electronics (IDE) or serial advanced technology attachment (SATA) interface. Super I/O (SIO) device 136 may be connected to SB/ICH 104.

An operating system runs on processing unit 106. The operating system coordinates and provides control of various components within the data processing system 100 in FIG. 1. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 100 (Java is a trademark of Sun Microsystems, Inc. in the United States, other countries, or both).

As a server, data processing system 100 may be, for example, an IBM® eServer™ System p™ computer system, running the Advanced Interactive Executive (AIX™) operating system or the LINUX® operating system (eServer, System p, and AIX are trademarks of International Business Machines Corporation in the United States, other countries, or both while LINUX is a trademark of Linus Torvalds in the United States, other countries, or both). Data processing system 100 may be a symmetric multiprocessor (SMP) system including a plurality of processors in processing unit 106. Alternatively, a single processor system may be employed.

Instructions for the operating system, the object-oriented programming system, and applications or programs are located on storage devices, such as HDD 126, and may be loaded into main memory 108 for execution by processing unit 106. The processes for illustrative embodiments of the present invention may be performed by processing unit 106 using computer usable program code, which may be located in a memory such as, for example, main memory 108, ROM 124, or in one or more peripheral devices 126 and 130, for example.

A bus system, such as bus 138 or bus 140 as shown in FIG. 1, may be comprised of one or more buses. Of course, the bus system may be implemented using any type of communication fabric or architecture that provides for a transfer of data between different components or devices attached to the fabric or architecture. A communication unit, such as modem 122 or network adapter 112 of FIG. 1, may include one or more devices used to transmit and receive data. A memory may be, for example, main memory 108, ROM 124, or a cache such as found in NB/MCH 102 in FIG. 1.

Those of ordinary skill in the art will appreciate that the hardware in FIG. 1 may vary depending on the implementation. Other internal hardware or peripheral devices, such as flash memory, equivalent non-volatile memory, or optical disk drives and the like, may be used in addition to or in place of the hardware depicted in FIG. 1. Also, the processes of the illustrative embodiments may be applied to a multiprocessor data processing system, other than the SMP system mentioned previously, without departing from the spirit and scope of the present invention.

Moreover, the data processing system 100 may take the form of any of a number of different data processing systems including client computing devices, server computing devices, a tablet computer, laptop computer, telephone or other communication device, a personal digital assistant (PDA), or the like. In some illustrative examples, data processing system 100 may be a portable computing device which is configured with flash memory to provide non-volatile memory for storing operating system files and/or user-generated data, for example. In other illustrative embodiments, data processing device 100 may be any type of digital commercial product that utilizes a memory system in accordance with the illustrative embodiments, as discussed hereafter. For example, data processing device 100 may be a printer, facsimile machine, flash memory device, wireless communication device, game system, portable video/music player, or any other type of consumer electronic device. Essentially, data processing system 100 may be any known or later developed data processing system without architectural limitation.

Furthermore, data processing device 100 may employ many different types of memory for main memory 108. In some illustrative embodiments, main memory 108 may be a memory module, such as a dual in-line memory module (DIMM), single in-line memory module (SIMM), or other memory module or card structure. In general, a DIMM refers to a small circuit board or substrate that is comprised primarily of random access memory (RAM) integrated circuits, or dies, on one or both sides, i.e. planar surfaces, of the circuit board/substrate with signal and/or power pins along both sides of a common edge of the circuit board/substrate. A SIMM refers to a small circuit board or substrate composed primarily of RAM integrated circuits, or dies, on one or both sides, i.e. planar surfaces, of the circuit board/substrate and pins generally along both long edges, with each pin connected to the pin directly (or slightly offset from the pin) on the adjacent side.

As mentioned above, main memory 108 may be accessed by NB/MCH 102 using a high-frequency, high-bandwidth point-to-point interface or other known interfaces such as multi-drop. The interface on the memory module however is limited to the lower-bandwidth multi-drop eight-byte interface to the memory devices of the contemporary memory module. Thus, the illustrative embodiments provide mechanisms for enhancing the memory bandwidth available through a memory module. While the preferred embodiment is directed to a DIMM, the mechanisms described in the illustrative embodiment may be used with other memories, such as a SIMM, a memory card, a QUIMM (Quad inline memory module), or other carrier or assembly having electrical and dimensional attributes optimally suited for a given system environment.

In order to increase the memory bandwidth through a memory module, the illustrative embodiments implement multiple memory device data interfaces in a memory hub device of a memory module that interfaces between a memory controller of a processor and memory devices on the memory module. Providing multiple memory device data interfaces on the memory hub device results in a more even match between the bandwidth on a memory channel coupled to the memory module and the bandwidth of the memory device data interface of a single memory module. Additionally, the multiple memory device data interfaces on the memory hub device also double the storage capacity of the memory module.

The illustrative embodiment also provide for using a high-frequency, high-bandwidth point-to-point interface or memory channel that generally connects a memory hub device to another memory module in a daisy-chain configuration as an independent memory channel onto the memory module. Another illustrative embodiment provides a memory module stacking implementation that pins out data buses of two stacked four-bit wide memory devices separately but electrically connects the chip select signals of the two four-bit wide memory devices together for parallel access. A pin out is a term used in electronics to describe how an electrical connector, such as a memory module, is wired. An electrical connector typically consists of several electrical contacts or pins that can be used to carry electrical power or signals. Due to the wide variety of applications and manufacturers, a wide selection of electrical connectors exists with different types and numbers of contacts or pins. The pin out of an electrical connector identifies each individual pin. Proper identification of pins ensures that the signals and power are transmitted across the electrical connectors.

Figure 2:
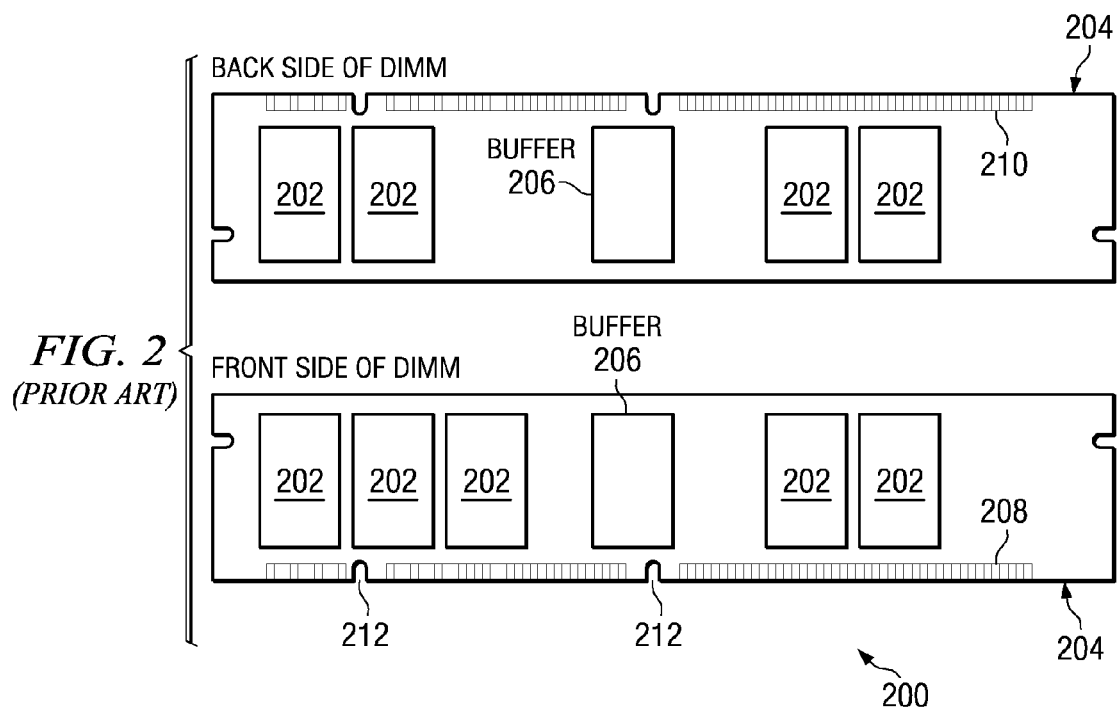
FIG. 2 depicts an exemplary synchronous memory module, such as a dual in-line memory module (DIMM)

FIG. 2 depicts an exemplary memory module, such as a dual in-line memory module (DIMM). Memory module 200 depicted in FIG. 2 may be part of main memory in a data processing device or system, such as main memory 108 in data processing system 100 of FIG. 1. Memory module 200 depicts a front planar side and a back planar side of a DIMM design for nine synchronous dynamic random access memory (SDRAM) chips 202, which may also be referred to as memory devices. In the depiction of FIG. 2, the backside view of the DIMM (top of drawing) may be rotated down such that the notches, or keys, on the edges are aligned with the notches, or keys, on the edges of the front side view of the DIMM (bottom of drawing).

In the depicted example, SDRAM chips 202 are arranged on the front and back sides of printed circuit board 204 with corresponding buffer 206 centrally disposed on each side. Thus, SDRAM chips 202 may be referred to as being disposed on a right side and a left side, relative to buffer 206, of the front side and on a right side and a left side, relative to buffer 206, of the back side. When viewed as an assembled memory module, connector pins 208 on the front side of printed circuit board 204 are disposed along a common edge with connector pins 210 on the back side of printed circuit board 204.

Keys 212 provide a positive mechanical interlock for systems solely supporting DRAM or SDRAM. In the exemplary embodiment, systems supporting both DRAM and SDRAM would have no connector key in this position. A side edge key may be used to inform the controller of the type of memory technology employed, e.g., flash write, EPROM, etc. or in other embodiments, may be used to identify operating voltage or other operational features for which a mechanical means is optimal to prevent system or module damage. Memory module 200 may be coupled to a memory controller of a data processing system, which controls the reading and writing of data from and to memory module 200. The DIMM depicted in FIG. 2 includes 168 pins in the exemplary illustration, whereas subsequent DIMMs may be constructed with pin-counts ranging from 100 pins to over 300 pins, and in alternate exemplary embodiments, pins may be placed on more than one edge to permit interconnection to alternate interfaces (e.g. test, diagnostic, characterization, add-on memory/extended memory, etc).

Figure 3:
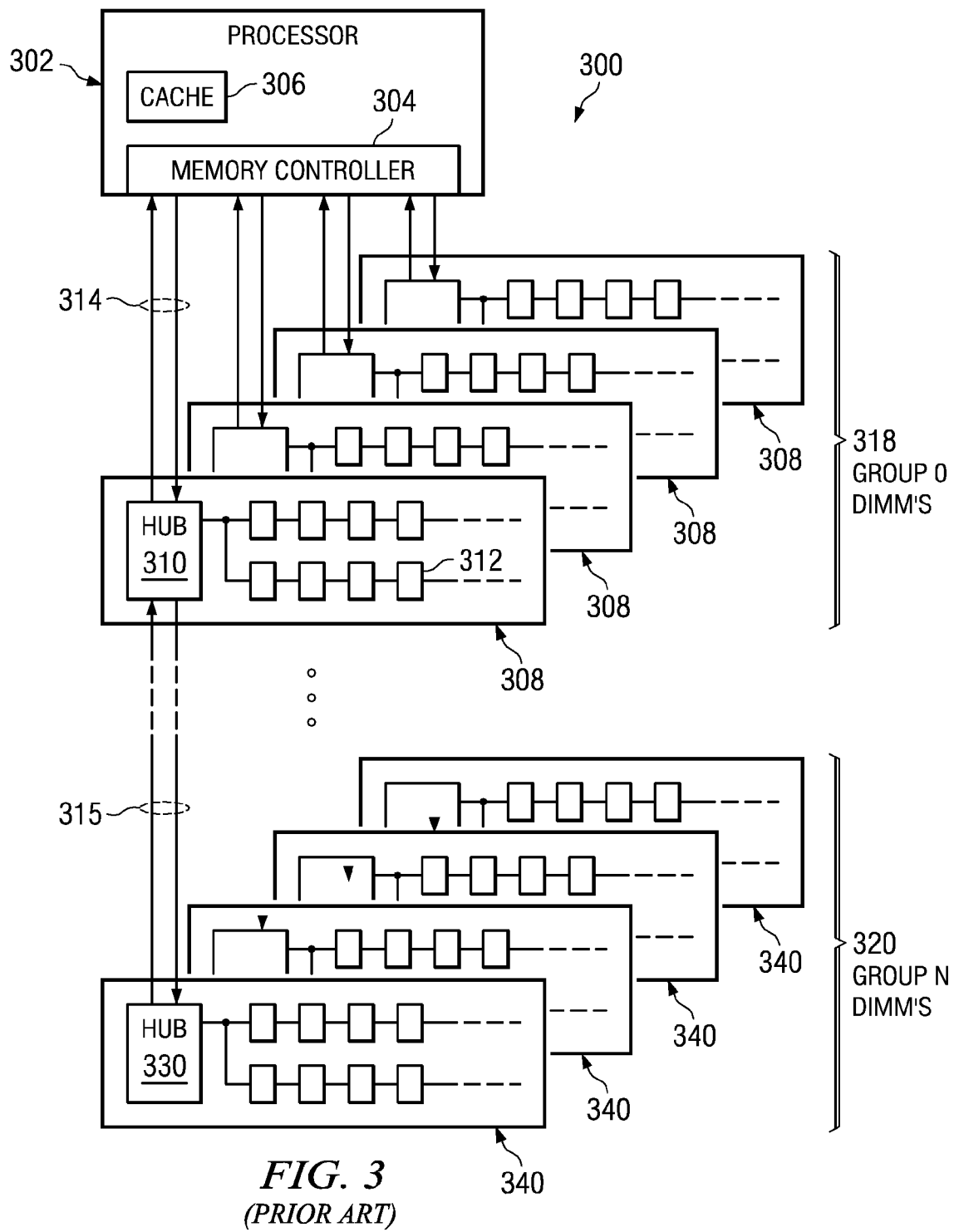
FIG. 3 illustrates an exemplary data processing system coupled to a subsystem of memory modules.

FIG. 3 illustrates an exemplary data processing system coupled to a subsystem of memory modules. Data processing system 300 includes processor 302, with memory controller 304 and cache 306 integrated thereon, and one or more memory modules 308, such as memory module 200 of FIG. 2. Each of the memory modules 308 may include a memory hub device 310 connected to one or more memory devices 312. Each of memory modules 308 connects via bus structures 314 or memory channels that are connected to processor 302 through a cascade interconnect bus structure, which may also be referred to as a hub-and-spoke topology. Memory controller 304 is interconnected to memory hub devices 310 of the memory modules 308 via one or more memory channels 314. Memory hub devices 310 may also be interconnected to other memory hub devices 330 of other memory modules 340 in an nth group of DIMMs 320 or to a standalone repeater hub device using memory channel 315.

Each memory hub device 310 and 330 provides one or more low speed connection(s) to groups of memory devices 312 following, for example, the fully buffered DIMM standard. The connections to the memory devices may include both common and independent signals to the one or more memory devices, with the signals comprising one or more of data, address, command, control, status, reset, and other signals present in contemporary or future memory devices. Multiple identically configured memory modules 308 are logically grouped together into module groups 318 and 320, and may be operated on in unison or with a subset of the modules selected based on the commands issued by memory controller 304 to provide for optimal latency, bandwidth, and error correction effectiveness for system memory cache line transfer, diagnostics, and other communication modes to the memory storage.

In the exemplary embodiment, memory controller 304 translates system requests for memory access into packets according to a memory hub device communication protocol. Typically, memory write packets contain at least a command, address, and associated data. Memory read packets typically contain at least a command and address, and imply that an expected packet will be returned which contains the requested data and/or information related to the read request. Memory controller 304 sends the memory write packets and memory read packets to memory hub device 310 of a memory module 308. Memory hub device 310 routes the packets to a corresponding memory device 312 associated with memory hub device 310 or another memory hub device 330 of another memory module 340, or a standalone repeater hub device. The details of how memory hub device 310 may route the packets in this manner will be provided with reference to FIG. 4 hereafter.

Figure 4:
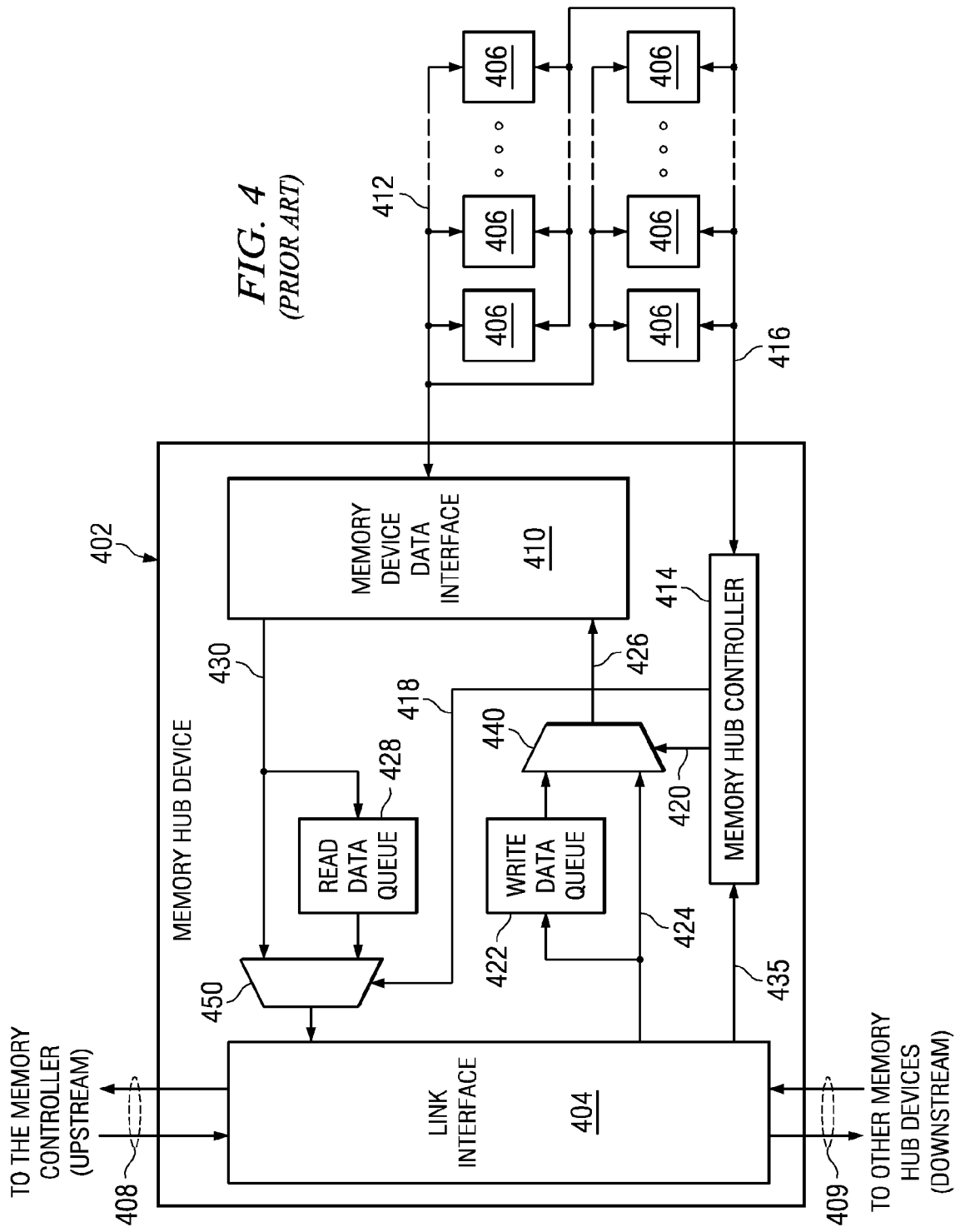
FIG. 4 depicts an exemplary block diagram of a memory hub device of a memory module.

FIG. 4 depicts an exemplary block diagram of a memory hub device of a memory module. Memory hub device 402, such as memory hub device 310 of FIG. 3, may be connected to a memory controller (not shown), such as memory controller 304 of FIG. 3, through memory channel 408, which may be a multi-drop bus structure, point-to-point bus structure, or the like, that may further include a cascade connection to one or more additional memory hub devices or standalone repeater hub device. In the exemplary embodiment, memory channel 408 is a high bandwidth bus structure on which memory access requests are transmitted and received by the memory controller through the memory channel to and from memory hub device 402.

Exemplary memory hub device 402 comprises link interface 404 that receives high-speed memory access requests from an upstream or downstream memory hub device (not shown) or from a memory controller (not shown) via memory channel 408 or 409. Link interface 404 also provides the means to re-synchronize, translate, and re-drive high-speed memory access requests to memory devices 406 and/or to re-drive the high-speed memory access requests downstream or upstream on memory channel 409 as applicable using known memory system communication protocols. Link interface 404 may also receive read data packets from a downstream or upstream memory hub device (not shown) on memory channel 409. Link interface 404 may select between the read data packets from the downstream or upstream memory hub device and the data from memory devices 406 internal to memory hub device 402 using known memory system communication protocols, and then send the data upstream or downstream on memory channel 408.

Memory hub controller 414 responds to access request packets, i.e. write packets and read packets, by responsively driving memory devices 406 using memory device address and control bus 416. Memory hub controller 414 also controls data flow by directing read data flow selector 418 and write data flow selector 420. Link interface 404 decodes the data packets received from the memory controller and directs the address and command information to memory hub controller 414. Memory write data from link interface 404 may be temporarily stored in write data queue 422 before being provided to multiplexer 440. Alternatively, the memory write data may be directly driven to multiplexer 440 via internal bus 424. Memory hub controller 414 uses the address of the write data and control information from the write packet to control write data flow selector 420 and, thus, multiplexer 440 such that multiplexer 440 sends the memory write data from write data queue 422, where the address specific write data may be stored, or internal bus 424 if the address specific write data is sent directly from link interface 404. The memory write data may then be sent via internal bus 426 to memory device data interface 410. Memory device data interface 410 then sends the memory write data to memory devices 406 via memory device data bus 412. While all of memory devices 406 receive the write data, only the memory device having the address of the write data actually stores the write data. In the exemplary embodiments, memory device data interface 410 is an eight-byte data interface that manages the technology-specific data interface with memory devices 406, and further controls the bi-directional memory device data bus 412. However, memory device data interface 410 may be comprised of more or less bytes based on the application requirements, alternate reliability structures (requiring more or less data bits), mechanical (and other) limitations or the like.

As an example of the command flow for a write data command, when the memory controller, such as memory controller 304 of FIG. 3, issues a write data command to memory devices 406 on memory hub device 402, the memory controller will transmit both a write data command and write data to memory hub device 402 via memory channel 408. Link interface 404 decodes the address information associated with the write data and, if the write data is targeted to memory devices 406, link interface 404 moves the write data to a buffer in write data queue 422. The selection of a buffer may be determined in many ways, such as a first in first out queuing method, a buffer implicitly defined in the write data command, or other buffer management implementation. Memory hub device 402 generally stores the write data in write data queue 422 prior to the write data command being issued, but, depending on the protocol of memory devices 406 and memory channel 408, some or all of the write data may be transferred directly from link interface 404 to memory device data interface 410 via multiplexer 440 under control of memory hub controller 414 and write data flow selector 420. Memory hub controller 414 uses the address of the write data and write data command to control write data flow selector 420 and, thus, multiplexer 440 so that multiplexer 440 sends the memory write data from write data queue 422, where the address specific write data may be stored, or internal bus 424 if the address specific write data is sent directly from link interface 404.

After the write data has been transferred, the memory controller will issue a write data command to link interface 404 on memory channel 408. Control logic in link interface 404 will, in parallel, forward the write data command to downstream memory hub devices on memory channel 409 and further decode the write data command to determine if the write data command is targeted at memory devices 406 attached to memory hub device 402. If the write data command is targeted for memory devices 406, link interface 404 forwards the write data command to memory hub controller 414 to be executed via internal bus 435. Memory hub controller 414 converts the write data command into the correct protocols for memory devices 406 installed on memory module. Memory hub controller 414 sends the write data command to memory devices 406 over memory device address and control bus 416. While all of memory devices 406 receive the write data command, only the memory device with the address of the write data actually executes the write data command. If the write data is stored in write data queue 422, memory hub controller 414 transfers, at an appropriate time, the write data from write data queue 422 to memory device data interface 410 using write data flow selector 420. Memory device data interface 410 forwards the write data to memory devices 406 on memory device data bus 412.

Memory read data may also be provided from memory devices 406 to memory device data interface 410 via memory device data bus 412. Memory device data interface 410 may provide the memory read data to multiplexer 450 directly via internal bus 430 or indirectly via read data queue 428 and internal bus 430. Multiplexer 450 outputs data to link interface 404 using read data flow selector 418 under control of memory hub controller 414. Memory hub controller 414 uses the address of the read data to control read data flow selector 418 and, thus, multiplexer 450 so that multiplexer 450 sends memory read data from read data queue 428, where the address specific read data may be stored, or internal bus 430 if the address specific read data is to be sent directly to link interface 404. Link interface 404 may then transmit the memory read data upstream on memory channel 408 to a memory controller in a processor as one or more read reply packet(s).

An example of the command flow for a read data command, when memory hub device 402 receives a read data command on memory channel 408, control logic in link interface 404 will, in parallel, forward this read data command to any downstream memory hub device on memory channel 409, and further decode the read data command to determine if the read data command is targeted at memory device 406 attached to memory hub device 402. If link interface 404 determines that the read data command is targeted for memory hub device 402, link interface 404 forwards the read data command using internal bus 435 to memory hub controller 414 to be executed. Memory hub controller 414 converts the read data command into the correct protocols for memory devices 406 installed on the memory module. Memory hub controller 414 then sends the read data command to memory devices 406 over memory device address and control bus 416. While all of memory devices 406 receive the read data command, only the memory device with the address of the read data actually executes the read data command and sends the read data to memory device data interface 410. Memory devices 406 execute the read data command and transfer a read data packet to memory device data interface 410 over memory device data bus 412.

Under control of memory hub controller 414, memory device data interface 410 transfers the read data packet to either read data queue 428 or directly to link interface 404 to be transferred back to the memory controller using memory channel 408. Memory hub controller 414 uses the address of the read data to control read data flow selector 418 and, thus, multiplexer 450 so that multiplexer 450 sends the memory read data from read data queue 428, where the address specific read data may be stored, or internal bus 430 if the address specific read data is to be sent directly to link interface 404. If the read data is stored in read data queue 428, memory hub controller 414 will decide when to move the stored data to link interface 404 depending on the state of read data queue 428 and the state of link interface 404. If there is already data in read data queue 428 pending transfer to link interface 404, then memory hub controller 414 directs the new read data to read data queue 428. Memory hub controller 414 directs data out of read data queue 428 in a first in, first out manner. Additionally, if link interface 404 is busy moving data from memory channel 409, then memory hub controller 414 delays the transfer of read data until there is an opening on memory channel 408. Any known method may be used to manage read data queue 428.

The illustrative embodiments provide mechanisms for increasing the usable bandwidth of a memory system. One illustrative embodiment provides for supporting partial cache line read operations to a memory module to reduce read data traffic on the memory channel. Another illustrative embodiment provides for supporting partial cache line write operations to a memory module to reduce write data traffic on the memory channel. A further illustrative embodiment provides for increasing the available bandwidth on the memory channel by managing memory device error correction within a memory hub device. Yet another illustrative embodiment provides for a variable width memory device data interface to memory devices that allows additional error correction capability at the memory device level that is transparent to the memory channel.

Figure 5:
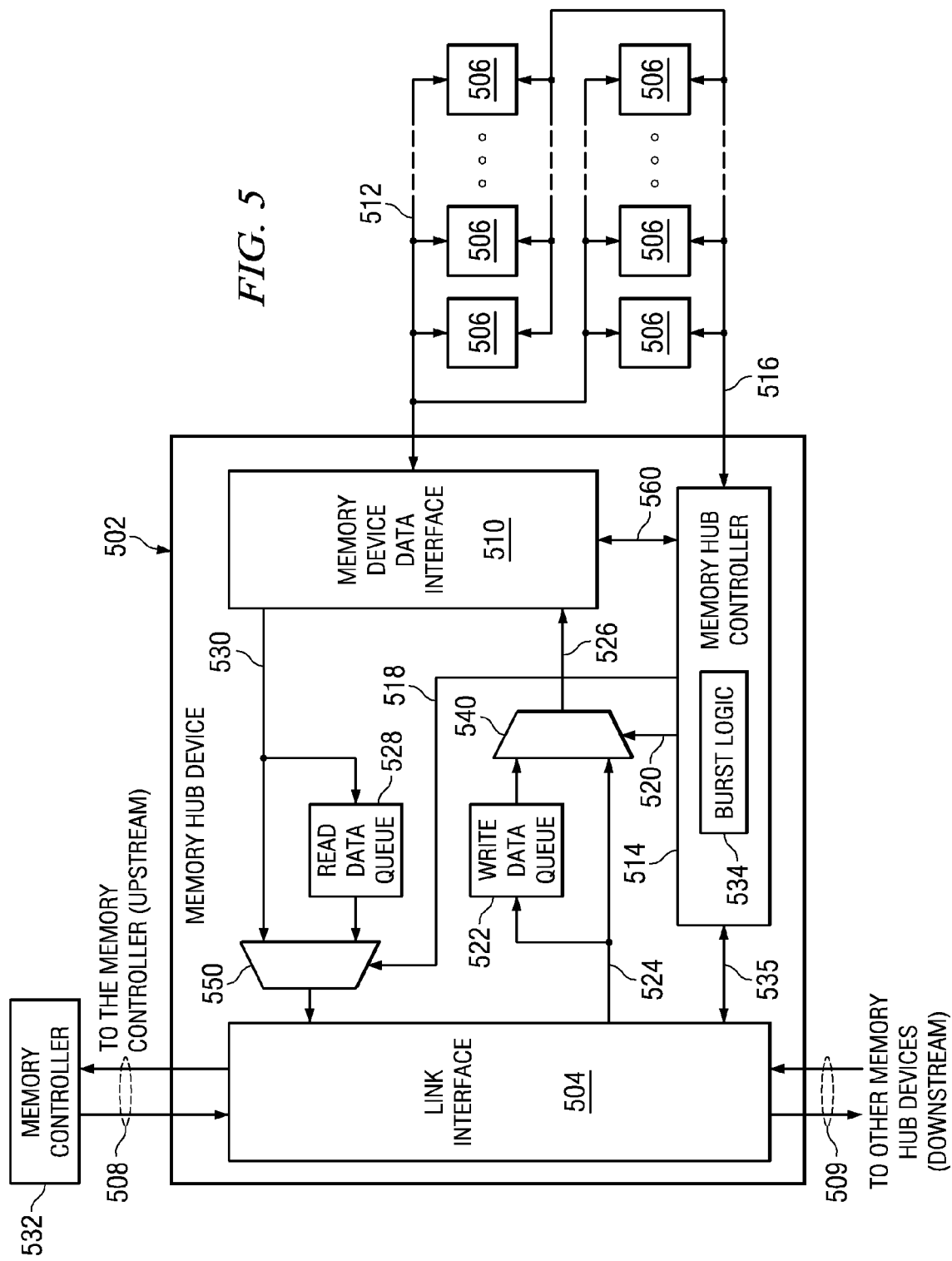
FIG. 5 depicts a buffered memory module within a memory system that comprises an enhanced memory hub device in accordance with one illustrative embodiment.

FIG. 5 depicts a buffered memory module within a memory system that comprises an enhanced memory hub device in accordance with one illustrative embodiment. In order to increase the usable bandwidth of the memory system, the illustrative embodiment implements the enhanced memory hub device to handle data access requests that are less than the full conventional cache line burst. The enhanced memory hub device comprises mechanisms for supporting partial cache line read and write operations from and to a memory module. By supporting partial cache line transfers, only the requested data for the read or write operation will be transferred on the memory channel versus always transferring a full cache line. This reduction in unwanted data traffic allows additional requests to be processed allowing more read or write operations to complete in a given time frame thereby increasing the efficiency and available bandwidth of the memory channel.

With reference to FIG. 5, memory hub device 502 includes, in addition to the elements particular to the illustrative embodiments, elements that are similar to elements depicted in memory hub device 402 of FIG. 4. Thus, elements in FIG. 5 that are not specifically described as operating differently from elements in FIG. 4 are intended to operate in a similar manner as their corresponding elements in FIG. 4. For example, memory hub device 502 includes link interface 504, memory devices 506, and memory channels 508 and 509, each of which operate in a similar manner to that described with the corresponding elements in FIG. 4. However, to handle data access requests from memory controller 532 that are less than the full conventional cache line burst, memory hub controller 514 includes burst logic 534 so that only the data that needs to be transferred to and from memory devices 506 will in fact be transferred. In the illustrative embodiments, the transfer of data is different for read data transfers and write data transfers, as described hereafter.

In known memory systems, responsive to a read data transfer from a memory controller, a conventional fully buffered memory module only transfers a full burst of data to the memory controller on the memory channel. This read data transfer is generally equal in length to the conventional burst from the memory device on the memory module, but may be in some cases a multiple of the burst length of the memory device. For example, for a double-data-rate three (DDR3) memory module, the burst length is 8 beats, which is equivalent to 64 bytes of data, on a conventional eight-byte wide memory module. A "beat" refers to an amount of data that may be transferred during a single data cycle on the interface. There may be one, two, or more data beats in a single clock cycle on the memory interface as the data may run at a multiple of the clock rate, for example, a DDR device runs the data interface at double the clock rate to the device.

The number of beats on memory channel 508 will depend on the width and data rate of memory device data bus 512, which is generally eight bytes, and the width and data rate of memory channel 508. For example, for a buffer design with an eight-byte memory device data interface and a two-byte memory channel that runs the channel at 4 times the data rate of the memory interface, a conventional burst would be 8 beats on memory device data bus 512 and 32 beats on memory channel 508. Other configurations of interfaces widths and clock ratios are possible and include synchronous and unsynchronous interfaces between the two buses. The memory module will be configured at initial program load (IPL) with the correct burst length for the conventional cache line transfer, which may be performed by scanning memory hub device 502, by use of firmware, or by any other common means of initialization. This configuration register that indicates how many beats of data should be sent on a read access. The number of beats of data on the memory channel will depend on the width of the memory channel, the clock ratio between the memory channel and the memory device, the conventional burst length from the memory device, and the amount of data that the system generally requires in a single burst. Conventional systems generally transfer cache lines in bursts of 64, 128, or 256 bytes, although other lengths are possible. For cases where there is a request for less than the full cache line burst, the memory module will still transfer the full cache line and the memory controller will just discard the extra data. For example, in a system with a cache line burst of 64 bytes where the processor only needs some portion of this data, such as 32 bytes, 16 bytes, 8 bytes, or the like, a conventional buffered memory module still transfers 64 bytes of data to the memory controller on the memory channel regardless of the amount of data actually required by the processor. Thus, extraneous data is transferred and absorbs otherwise useable bandwidth of the memory channel. The illustrative embodiments reduce this extraneous data and, as a result, effectively increase the amount of available bandwidth to be used in transferring data that is actually required or used.

For example, in a memory system where a full burst is 64 bytes and memory hub device 502 receives a read data command request for a 16 byte burst of read data, or ¼ of a full burst, control logic in link interface 504 will, in parallel, forward this read data command to the downstream memory hub device on memory channel 509 and decode the read data command to determine if the read data command is targeted at memory devices 506 attached to memory hub device 502. If link interface 504 determines that the read data command is targeted to memory hub device 502, link interface 504 forwards the read data command using internal bus 535 to memory hub controller 514 to be executed. Memory hub controller 514 converts the read data command into an appropriate format for attached memory devices 506. Memory hub controller 514 sends the converted read data command to memory devices 506 over memory device address and control bus 516. While all memory devices 506 receive the read data command, only the memory device with the address of the read data actually executes the read data command and sends the read data to memory device data interface 510.

Memory devices 506 execute the converted read data command and transfer a read data packet to memory device data interface 510 over memory device data bus 512. The read data packet transferred by memory devices 506 may be the full burst of 64 bytes or it may be a partial burst of data depending on the capability of memory devices 506 to transmit different burst lengths. In general, conventional memory devices only transfer a single fixed burst length.

Using burst logic 534, memory hub controller 514 determines the amount of read data that the read data command requested to be read from memory devices 506. Burst logic 534 generates a burst length field indicating that only 16 bytes of data should be transmitted. Memory hub controller 514 sends the burst length field via control bus 560 to memory device data interface 510, such that memory device data interface 510 transfers only the requested ¼ burst of 16 bytes of read data to either read data queue 528 or directly to link interface 504 via internal bus 530. Memory hub controller 514 uses the address of the read data to select read data from read data queue 528 or directly transfer the data from memory device data interface 510 to control multiplexer 550 via read data flow selector 518 and send the read data on to memory controller 532 on memory channel 508. The remainder of the read data received by memory device data interface 510 will be discarded as it was not requested by the read data command.

Memory hub controller 514 sends control signals to link interface 504 over internal bus 535 to inform link interface 504 that there is read data on the output of multiplexer 550 that needs to be transferred to memory controller 532 using memory channel 508. The control signals sent by memory hub controller 514 may indicate on a cycle-by-cycle basis that the read data is valid, indicate the start of the data and a burst length, or the like. If the read data resides in read data queue 528, memory hub controller 514, at an appropriate time, decides to transfer or transmit the stored read data to link interface 504 depending on the state of read data queue 528 and the state of link interface 510. If there is already existing data in read data queue 528 pending transfer to link interface 504, then memory hub controller 514 directs the new read data to read data queue 528 using read data flow selector 518. Memory hub controller 514 may direct data out of read data queue 528 in a first in, first out manner. Additionally, if link interface 504 is busy moving data from memory channel 509, then memory controller 514 delays the transfer of read data until there is an opening on memory channel 508. Any known method may be used to manage read data queue 528. While this example is for a 16 byte burst of read data, other burst lengths operate in a similar manner.

That is, the burst length field from burst logic 534 may indicate that the read data transfer should be a full burst, a half burst, a quarter burst, or the like, stepping in half until reaching a smallest burst that may be managed by error protection code of memory channel 508. The error protection code may be any type of error protection code, such as cyclic redundancy check (CRC), error correction code (ECC), or the like. Moreover, read data transfer lengths may be limited based on whether the memory system is running with error protection code in the memory that is independent to the error protection code on the channel. That is, if error correction code is in use in memory, then the minimum transfer length will be limited by the amount of data required by the codeword. An error protection codeword is the amount of data that is required by the architecture of the error protection code to be able to determine if there are any errors in the data and to be able to correct the number of errors that the code is architected to correct.

For example, a conventional ECC codeword known in the art to be 16 bytes. This codeword consists of 16 bytes of data plus 2 bytes of code bits to contain the code data used to check and correct the data. Data transfers in this description are described by how much data they transfer, thus for a 64 byte data transfer using that 16 byte ECC codeword, there would be 64 bytes of data transferred plus an additional eight-bytes of code data. In all references to the transfer lengths and packet lengths in this patent only the data being transferred is referenced. Those knowledgeable in the art know that in addition to the data being transferred, there is additional code data or code bytes transferred, with the amount of this code bytes being dependent on the code type in use. Generally, these code bytes are transferred in parallel with the data so that there is no impact to the burst lengths of the data transfer. For example on a two-byte wide memory channel there would be two extra bits in width to transfer the code bits with the data. Although this is the conventional practice, the code bits may also be transferred in additional beats on memory channel after the data has been transferred to avoid adding signals to the channel. Conventional memory modules that support ECC have a memory device data interface that is 9 bytes wide, although other widths are possible. These memory modules are sometimes referred to as having eight-byte wide data interfaces as only 8 of the 9 bytes are actually used for data. For example, a memory module that has a four-to-one data width and data rate ratio between the memory interface and the memory channel width, would have 18 bits on the memory channel interface and 72 bits on the memory interface internal to the memory module. Thus, with this memory module, if the codeword is a 16 byte codeword and the high bandwidth memory channel is 2 bytes wide (actually 18 bits to carry the extra bit for ECC), the minimum transfer length on the high bandwidth channel would be 8 beats of data to move a full ECC codeword to the memory controller.

As with read data transfers, responsive to a write data transfer from a memory controller, a conventional fully buffered memory module will only transfer a full burst of data to the memory devices even though the memory controller only wants to write some portion of a full burst of data. Like the read data transfer, the write data transfer is equal in length to the cache line transfer length of the processor in the system, which is generally 64 bytes but may be smaller or larger depending on the architecture of the system. This transfer length will be some multiple of the conventional burst from the memory device on the memory module. Thus, as an example, if memory controller 532 only wants to write a portion of the full cache line, memory controller 532 must first issue a read data transfer to the memory module to retrieve the rest of the cache line from the memory module and perform a read-modify-write within the memory controller, before the memory controller can issue the write data command to the memory module. So in addition to the lost bandwidth due to transferring extra write data on the memory channel, more bandwidth would be lost in the transfer of a full burst of read data that would need to be transferred to the memory controller if the memory controller were to perform a conventional read-modify-write operation.

With the illustrative embodiments, in a memory system where a full burst is 64 bytes and memory hub device 502 receives a write data command request from memory controller 532 for a 16 byte burst of write data, or ¼ of a full burst, control logic in link interface 504 will, in parallel, forward this write data command to the downstream hub(s) on memory channel 509 and decode the write data command to determine if the write data command targets memory devices 506 attached to memory hub device 502. If link interface 504 determines that the write data command targets memory hub device 502, link interface 504 transfers the write data command to memory hub controller 514 via internal bus 535. To support variable burst lengths, memory controller 532 will include a burst length field with the write data command packet and with the memory write data command to indicate to memory hub device 502 the amount of data associated with the write data command. For this example, the write data command will indicate that the write data to be transferred is 16 bytes in length versus the full length of 64 bytes.

If link interface 504 determines that the write data command targets memory hub device 502, link interface 504 moves the received write data to a buffer in the write data queue 522 via internal bus 524. The selection of a buffer may be determined in many ways, such as a first in first out queuing method, a buffer implicitly defined in the write data command, or other buffer management implementation. Memory hub device 502 generally stores the write data in write data queue 522 prior to the write data command being issued, but, depending on the protocol of memory devices 506 and memory channel 508, some or all of the write data may be transferred directly from link controller 504 to memory device data interface 510 via multiplexer 540 under control of memory hub controller 514 and write data flow selector 520 based on the address of the write data.

After the write data has been stored in write data queue 522 or, alternatively, transferred to memory device data interface 510, memory hub controller 514 converts the write data command into an appropriate format for attached memory devices 506. Memory hub controller 514 sends the converted write data command to memory devices 506 over memory device address and control bus 516. While all of memory devices 506 receive the write data command, only the memory device with the address of the write data actually executes the write data command. If the write data was stored in write data queue 522 rather than being directly transferred by write data flow selector 520, memory hub controller 514 transfers, at an appropriate time, the write data from write data queue 522 to memory device data interface 510. Memory device data interface 510 forwards the write data to memory devices 506 via memory device data bus 512. Memory devices 506 will then execute the write data command and transfer the write data to its internal memory cells.

The write data command protocol supporting write operations to a memory device that are not a full burst length will vary with the type of memory devices that are installed in the system. The write data command protocol may be indicated by a burst length field in the write data command sent to the memory device, by a separate mask control field to indicate which beats of data to write, or the like. For this example, memory devices 506 use a data mask signal to control which beats of data they write into the internal memory cells of memory devices 506. Memory devices 506 activate the data mask signal on each cycle where the write is to be blocked. Memory hub controller 514 uses the burst length field generated by burst logic 534 to in turn send the data mask signal to memory device data interface 510 at the same time memory hub controller 514 transfers write data from multiplexer 540 to memory device data interface 510 using write data flow selector 520. In turn, memory device data interface 510 sends the data mask signal with each beat of write data sent on memory device data bus 512 to memory devices 506 that are associated with the write data command. For this example, where only 16 bytes of a 64 byte burst are to be written to memory devices 506, the data mask signal will be inactive for the first 2 beats of the transfer and active for the final 6 beats of the transfer. Memory device data interface 510 sends the write data for all 8 beats of the burst but only the first two beats will contain valid write data to be written into memory devices 506. The remaining six beats of write data sent by memory device data interface 510 is in a "do not care" state. A "do not care" state implies that the write data may be random or bogus data as the data will not be used by memory devices 506.

Thus, burst logic 534 provides a burst length field that is associated with each read or write access request and improves the efficiency and usable bandwidth of memory channel 508. That is, memory hub device 502 sends only the requested read data to memory controller 532 for a read access request and memory controller 532 only sends the requested write data to memory hub device 502 for a write access request. Therefore, memory channel 508 may not be overrun with needless read data and write data.

Figure 6:
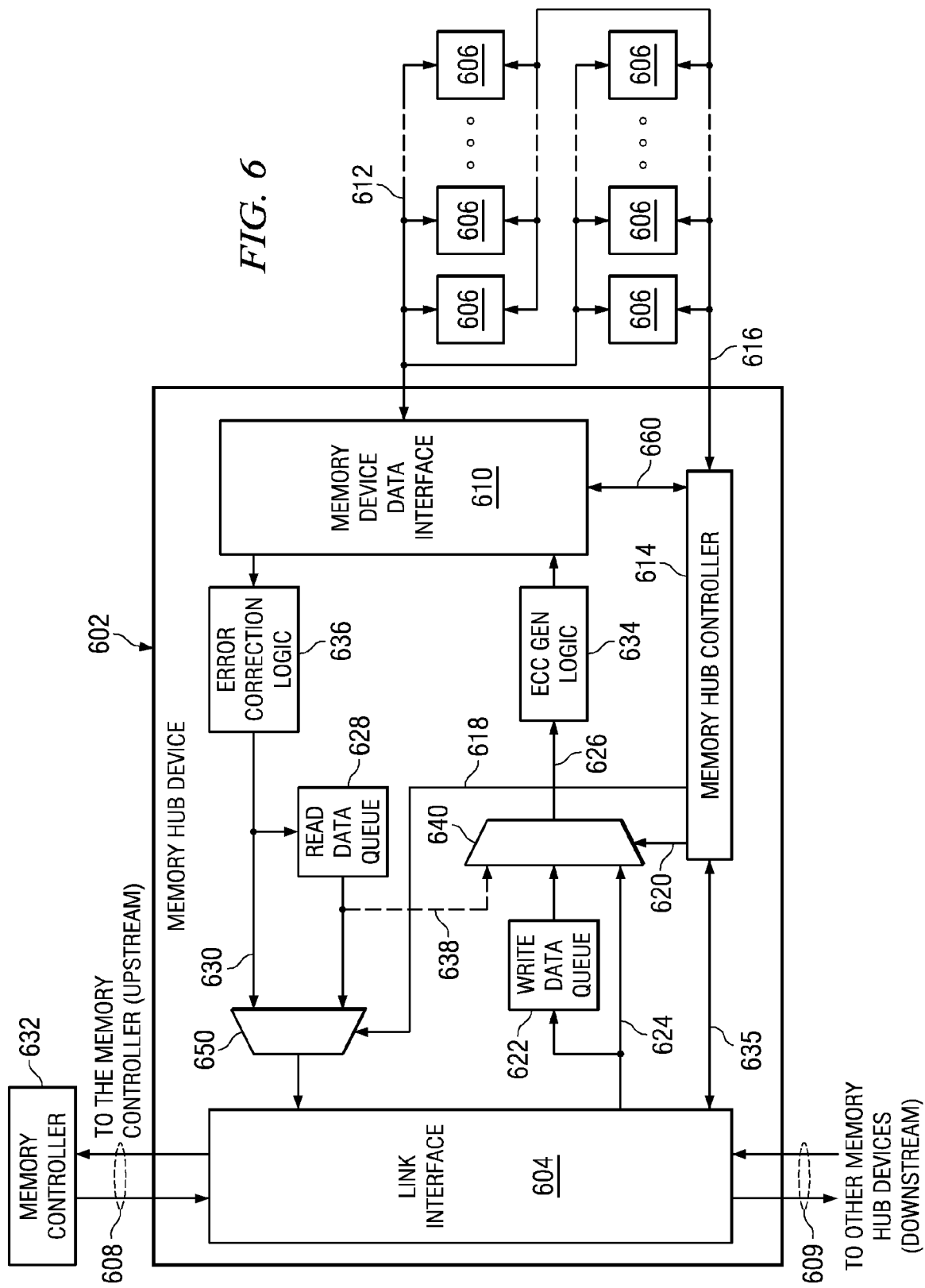
FIG. 6 depicts a buffered memory module within a memory system that manages memory device error correction within a memory hub device in accordance with one illustrative embodiment.

FIG. 6 depicts a buffered memory module within a memory system that manages memory device error correction within a memory hub device in accordance with one illustrative embodiment. In order to increase the usable bandwidth of the memory system, the illustrative embodiment provides a shadow copy of error correction logic within the memory hub device. With error correction logic in the memory hub device, the memory hub device may reduce the length of data transfers on the memory channel as the data that is transferred will not require error correction code (ECC) bits. To fully understand this savings in channel bandwidth, a brief description of how data is sent across a memory channel is provided.

For a memory system that uses error correction codes when a data transfer of 64 bytes is sent to the memory hub device, in addition to the 64 bytes of data there will be an additional 8 bytes of error code data that is transferred. So a 64 byte data transfer is actually 72 bytes of total space on the memory channel. The memory channel handles this extra data in one of two methods: either the width of the memory channel is increased so that the extra error code data is sent in parallel with the data transfer, or additional data beats are added to the data transfer to send the error code data. The conventional method of sending the data is to widen the memory channel so, for example, if the memory channel was set to 16 bits (2 bytes) in width for the data transfer, the memory channel would be widened to 18 bits to allow the error code data to be transferred in parallel with the actual data. By placing a copy of the error correction code in the memory hub device, the memory system may now use the extra 2 bits in the memory channel to send either additional command information or data back across the memory channel. Placing a copy of the error correction code in the memory hub device allows the memory hub device to pack a 64 byte data transfer in less beats on the memory channel and gain additional bandwidth for additional data transfers.

In addition with the error correction code in the memory controller the minimum transfer that may be sent across the high bandwidth interface is equal to the code length of the error correction code. This code length is the amount of data that is required by the system architecture to check and correct the returning data from memory. This code length may vary by system as there are conventional error correction codes that are different in length but most error correction codes for memory are either 8 bytes or 16 bytes in length.

However, as memory systems attempt to become more error resistant, the code length may increase in size and be 32 bytes or longer in length. By moving the error correction code into the memory hub device, the minimum transfer length may be reduced to a single bit of data instead of being limited by the length of the error correction code. This allows much smaller data transfers to be packed onto the memory channel, thereby saving bandwidth for additional read or write operations.

With reference to FIG. 6, memory hub device 602 includes, in addition to the elements particular to the illustrative embodiments, elements that are similar to elements depicted in memory hub device 502 of FIG. 5. Thus, elements in FIG. 6 that are not specifically described as operating differently from elements in FIG. 5 are intended to operate in a similar manner as their corresponding elements in FIG. 5. For example, memory hub device 602 includes link interface 604, memory devices 606, and memory channels 608 and 609, each of which operate in a similar manner to that described with the corresponding elements in FIG. 5. With a conventional buffered memory device, for every 64 bytes of write data that is sent from a memory controller to a memory hub device, there is an additional 8 bytes of ECC codewords added to the 64 bytes of write data. The code bits are distributed across the data bits with 1 additional bit for every 8 bits of data. Likewise, for every 64 bytes of read data that is sent from a memory hub device to a memory controller, there is an additional 8 bytes of ECC codewords added to the 64 bytes of read data. This results in each access request being an equivalent of 72 bytes.

In order to improve the efficiency and usable bandwidth of memory channel 608, memory hub device 602 comprises ECC generation logic 634, which may generate error correction code after the write data has been sent from memory controller 632 to memory hub device 602, and error correction logic 636, which may correct read data prior to sending the read data from memory hub device 602 to memory controller 632. Thus, instead of sending 64 bytes of data for every read and write access request along with an additional 8 bytes of ECC codewords equating to a 72 byte transfer, read and write data may now be transferred to and from memory controller 632 without the ECC codewords, thereby reducing the amount of data transferred on memory channel 608.

As a further explanation of how memory hub device 602 handles a read access request that includes data that needs to be error checked and corrected, when memory hub device 602 receives a read access request from memory controller 632, memory hub controller 614 responds to the read access requests by responsively driving memory devices 606 using memory device address and control bus 616 to read out 64 bytes of read data from memory devices 606. While all of memory devices 606 receive the read data command, only the memory device with the address of the read data actually executes the read data command and sends the read data to memory device data interface 610. Memory devices 606 send 64 bytes of read data though memory device data interface 610 to error correction logic 636.

When the data that is being read was originally written to memory devices 606, ECC code bits were generated using an algorithm that generates a set of code bits for each block of data being written to memory, where a block of data is the width of the ECC code. When the data is being read from memory devices 606, error correction logic 636 uses the data bits and the code bits from the read operation to generate a set of check bits that will indicate if the data that is read is correct and, if not, generate pointers to correct the data. If the data is corrupted to the point that error correction logic 636 cannot correct the data, the check bits will indicate that the data is invalid and that error correction logic 636 is unable to correct the data. The mechanisms that error correction logic 636 uses to check and correct the data are dependent on the type of code used by the design. If error correction logic 636 determines that the data is free of errors or that it can be corrected by the code logic, the corrected data will be queued in the read data queue 628 or directly transferred to link interface 604 via internal bus 630 using read data flow selector 618 based on the address of the read data, to be transmitted upstream on memory channel 608 to memory controller 632.

If error correction logic 636 determines that the data is corrupted and error correction logic 636 is unable to correct the data, then memory hub controller 614 queues the uncorrected data and the original code bits, if they are required by the system for error logging or diagnostics, from the read request in read data queue 628, or directly transfers the uncorrected data and the original code bits from the read request to link interface 604 via internal bus 630 using read data flow selector 618. Link interface 604 then transmits the read data upstream on memory channel 608 to the memory controller 632. Along with the read data, link interface 604 transmits an error signal generated by error correction logic 636 to memory controller 632 to indicate that the read data packet is invalid and that the read data packet includes the uncorrected data and the ECC code bits. Memory controller 632 will then follow its conventional error handling procedure for errors received on memory read transfers. The error signal issued by error correction logic 636 may be issued as a separate bit on memory channel 608 using known error protocols. Even if error correction logic 636 issues an error signal of one bit, the efficiency of the memory channel has been improved by 63 bits, since 8 bytes of 64 bits of ECC codeword is not sent with the data on memory channel 608. Reducing the amount of ECC codewords that are sent on memory channel 608 may result in a recovery of 12 percent of bandwidth that may now be used for additional data transfers.

As an example of the command flow for a read data command, when memory hub device 602 receives a read data command packet on the high speed interface 608, control logic in link interface 604 will, in parallel, forward this command to the downstream memory hub device on memory channel 609 and decode the read data command to determine if the read data command is targeted at memory devices 606 attached to memory hub device 602. If link interface 604 determines that the read data command is targeted to memory hub device 602, link interface 604 forwards the read data command using internal bus 635 to memory hub controller 614 to be executed. Memory hub controller 614 converts the read data command into an appropriate format for attached memory devices 606. Memory hub controller 614 sends the converted read data command to memory devices 606 over memory device address and control bus 616. Memory devices 606 execute the read data command and transfer a read data packet to memory device data interface 610 over memory device data bus 612.

Under the control of memory hub controller 614, memory device data interface 610 transfers the read data packet to error correction logic 636, where the read data will be checked for errors, corrected when possible, and then forwarded to either read data queue 628 or directly to link interface 604 to be transferred back to memory controller 632 using memory channel 608. If the read data is correct, then error correction logic 636 forwards just the read data, without the error code bits to read data queue 628, or directly to link interface 604 based on the address of the read data. If the data is not correct, then error correction logic 636 forwards the original data and error code bits read from memory devices 606 along with an error status bit to read data queue 628 or directly to link interface 604.

If the read data is stored in read data queue 628, memory hub controller 614 decides to move the stored read data to link interface 604 from read data queue 628 depending on the state of read data queue 628 and the state of link interface 604. If there is already data in read data queue 628 pending transfer to link interface 604, then memory hub controller 614 places the new read data in read data queue 628 and then empties read data queue 628 to link interface 604 in a first in, first out manner. Additionally, if link interface 604 is busy moving data from memory channel 609, then memory hub controller 614 delays the transfer of read data until there is an opening on memory channel 608. The mechanisms used to queue data in read data queue 628 may be any type of known queuing mechanism.

As a further explanation of how memory hub device 602 handles a write access requests that exclude ECC codewords, when memory hub device 602 receives a write access request from memory controller 632, memory hub controller 614 may temporarily store the write data in write data queue 622 or directly drive the write data via internal bus 624 based on the address of the write data. Via multiplexer 640 under control of memory hub controller 614 and write data flow selector 620, write data may be transferred to ECC generation logic 634 from either write data queue 622 or internal bus 624 based on the address of the write data. ECC generation logic 634 uses an algorithm to calculate and generate ECC code bits for each codeword of write data, the width of the codeword is dependent on the error correction code used. Memory device data interface 610 then stores the write data and the generated ECC code bits on memory devices 606 using memory device data bus 612.

Therefore, write data may now be transferred without ECC codewords and the amount of write data sent on memory channel 608 may be reduced, thereby increasing the amount of bandwidth available on memory channel 608. Additionally, ECC generation logic 634 may also handle write data transfers that are less than the required beats of data in a single error correction codeword. For example, in order to write data that is less than the length of the error correction code, memory hub device 602 includes internal bus 638 for use in performing a read-modify-write operation to get enough data to fill out the ECC codeword. The read-modify-write operation reads out an amount of data from memory devices 606 that includes the address of data that is to be written to. Error correction logic 636 receives the read data and corrects any errors in the read data prior to merging the read data with the new write data. Once the read data is corrected and merged with the new write data the memory hub controller 614 initiates the write operation sends the modified data through the ECC generation logic 634 to generate the correct codewords for the write operation. Memory hub controller 614 then writes the modified write data and code bits back to memory devices 606. By performing the read-modify-write operation in memory hub device 602 as opposed to known systems that perform the read-modify-write operation in memory controller 632, the efficiency of memory channel 608 is improved because no additional bandwidth is required to perform the read-modify-write operation in memory controller 632. This is a significant bandwidth savings as execution of the read-modify-write operation in memory controller 632 requires that a full read operation be done on memory channel 608 along with a full write operation versus just transferring the required write data on memory channel 608.

As an example of the command flow for a write data command, when memory controller 632 issues a write data command to memory devices on a memory hub device, memory controller 632 transfers both the write data and the write data command via memory channel 608 to memory hub device 602. Memory controller 632 first transfers the write data in a write data command packet on memory channel 608. With this illustrative embodiment, only the actual write data will be sent on memory channel 608, the error correction code bits normally associated with the write data will not be transmitted. Link interface 604 decodes the write data and, if the write data is targeted to memory devices 606, link interface 604 moves the write data to a buffer in write data queue 622. The selection of a buffer may be determined in many ways, such as a first in first out queuing method, a buffer implicitly defined in the write data command, or other buffer management implementation. Memory hub device 602 generally stores the write data in write data queue 622 prior to the write data command being issued, but, depending on the protocol of memory devices 606 and memory channel 608, some or all of the write data may be transferred directly from link interface 604 to memory device data interface 610 via multiplexer 640 under control of memory hub controller 614 and write data flow selector 620.

After the write data has been transferred, memory controller 632 issues a write data command to link interface 604 on memory channel 608. Control logic in link interface 604 will, in parallel, forward the write data command to any downstream memory hub device on memory channel 609 and decode the write data command to determine if the write data command is targeted at memory devices 606 attached to memory hub device 602. If the write data command is targeted for memory devices 606, link interface 604 forwards the write data command to memory hub controller 614 to be executed. Memory hub controller 614 will determine if the length of the write data command is a multiple of the error correction code length. If the write data command is a multiple of the error correction code length, memory hub controller 614 converts the write data command into an appropriate format for attached memory devices 606. Memory hub controller 614 sends the converted write data command to memory devices 606 over the memory device address and control bus 616.

If the write data is stored in write data queue 622, memory hub controller 614 transfers, at an appropriate time, the write data from write data queue 622 to ECC generation logic 634 which generates the error correction code bits. Once ECC generation logic 634 generates the error correction code bits, ECC generation logic 634 forwards the write data and the error correction code bits to memory device data interface 610 where it will be forwarded to memory devices 606 on memory device data bus 612. Memory devices 606 execute the write data command received from memory hub controller 614 and transfer the write data packet to memory devices 606.

If memory hub controller 614 determines that the write data transfer length is less than a multiple of the error correction code length, then memory hub controller 614 uses the address of the write data command to issue a read data command to memory devices 606 over memory device address and control bus 616. When the read data is returned by memory devices 606 across memory device data bus 612 to memory device data interface 610, memory hub controller 614 directs the read data through error correction logic 636 to correct any errors in the read data. Error correction logic 636 sends the corrected read data to read data queue 628. Memory hub controller 614 moves the corrected read data from read data queue 628 on internal read-modify-write data bus 638 so that it can be merged with the write data that is in the write data queue 622. Once this merger is complete, memory hub controller 614 converts the write data command into an appropriate format for attached memory devices 606. This command is then sent to memory devices 606 over memory device address and control bus 616. At an appropriate time, memory hub controller 614 transfers the modified write data to ECC generation logic 634 where the error correction code bits will be generated. ECC generation logic 634 forwards the modified write data and the error correction code bits to memory device data interface 610. Memory device data interface 610 forwards the modified write data and error correction codes bits to memory devices 606 on memory device data bus 612. Memory devices 606 execute the write data command received from memory hub controller 614 and transfers the write data packet to memory devices 606.

Thus, the read and write data may now be transferred without ECC codewords and the amount of read and write data sent on memory channel 608 may be reduced, thereby increasing the amount of bandwidth available on memory channel 608.

Figure 7:
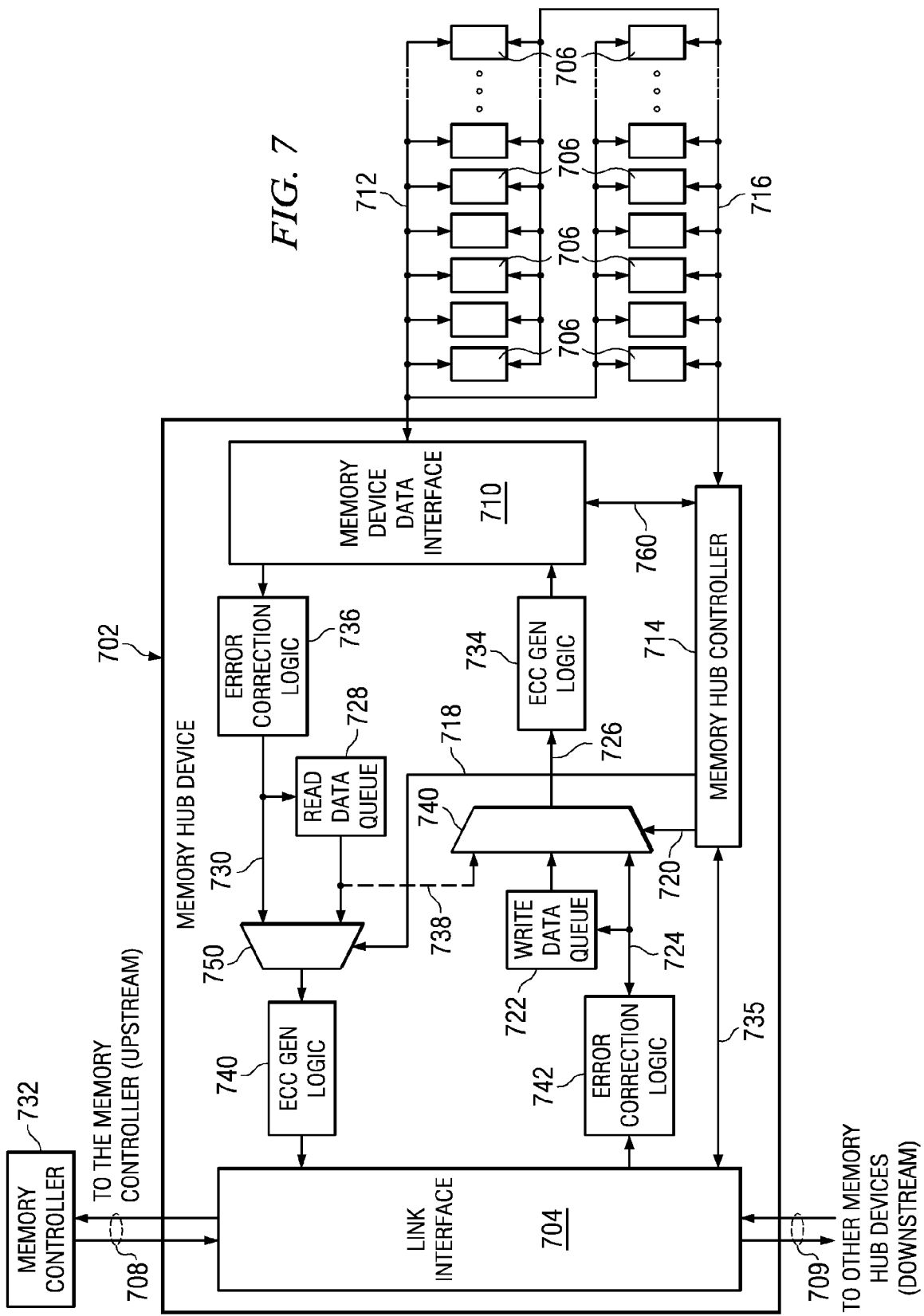
FIG. 7 provides variable width memory device data interface to memory devices within a memory hub device that allows additional error correction capability at the memory device level that is transparent to the memory channel in accordance with one illustrative embodiment.

While FIG. 6 depicts a buffered memory module within a memory system that manages memory device error correction thereby eliminating the need for the memory controller to perform error correction, there are other memory systems that require the error correction code (ECC) to be transmitted with each data access request, such as older systems where the memory controller and/or processor already perform error correction but may be equipped with the enhanced memory module described in the illustrative embodiments. For those memory systems that already perform ECC, FIG. 7 provides variable width memory device data interface to memory devices within a memory hub device that allows additional error correction capability at the memory device level that is transparent to the memory channel in accordance with one illustrative embodiment. Providing additional error correction capability at the memory device level may provide an improvement of the error recovery of a system and allow for less system repair actions due to memory device failures.

Known ECC codewords require 8 code bits for each 64 data bits on a memory device data interface. This variable width memory device data interface of the illustrative embodiments provides additional coverage by adding additional code bits within a codeword. For example, by increasing the code bits to 12, 16, or more bits for every 64 data bits, a stronger error correction codeword may be generated. While known error correction codes will correct a single bit failure, by providing additional codes bits, an error correction code may be designed that corrects a full memory device failure or even multiple memory device failures.

With reference to FIG. 7, memory hub device 702 includes, in addition to the elements particular to the illustrative embodiments, elements that are similar to elements depicted in memory hub device 602 of FIG. 6. Thus, elements in FIG. 7 that are not specifically described as operating differently from elements in FIG. 6 are intended to operate in a similar manner as their corresponding elements in FIG. 6. For example, memory hub device 702 includes link interface 704, memory devices 706, and memory channels 708 and 709, each of which operate in a similar manner to that described with the corresponding elements in FIG. 6. As previously stated, with a conventional buffered memory device, for every 64 bytes of data that is sent and received to and from a memory controller, there is an additional 8 bytes of ECC codeword added to the 64 bytes of data. This results in each access request being an equivalent of 72 bytes.

In order to improve the efficiency of memory controllers that already perform error correction, memory hub device 702 comprises ECC generation logic 740 and error correction logic 742. For a read access request memory hub device 702 operates in a similar manner to that described in FIG. 6 with regard to read access requests. However, since memory controller 732 is expecting to receive read data with ECC codewords and memory hub device 602 of FIG. 6 transmits read data without ECC codewords, memory hub device 702 also comprises ECC generation logic 740 to generate codewords to send to memory controller 732 with the requested data.

ECC generation logic 740 may receive from error correction logic 736 different types of data, such as data that is free from errors, data that has been corrected by error correction logic 736, and/or data that has errors and includes an associated error signal. Error correction logic 736 operates in the manner described above with respect to error correction logic 636 of FIG. 6. Based on the data that is received from error correction logic 736, ECC generation logic 740 may then generate an appropriate ECC codeword to be sent with the read data. ECC generation logic 740 uses an algorithm to calculate and generate an ECC code bit for each byte of read data using any error signals generated by error correction logic 736. Memory hub device 702 then transmits the read data along with the ECC codeword generated by ECC generation logic 740 upstream on memory channel 708 to memory controller 732.

Thus, while 72 bytes of data are still transferred on memory channel 708, the error correction performed by error correction logic 736 and ECC generation logic 740 may reduce the amount of error correction required to be performed by ECC in memory controller 732.

As an example of the command flow for a read data command, when memory hub device 702 receives a read data command packet on memory channel 708, control logic in link interface 704 will, in parallel, forward this read data command to any downstream memory hub device on memory channel 709 and decode the read data command to determine if the read data command is targeted at memory devices 706 attached to memory hub device 702. If link interface 704 determines that the read data command is targeted to memory devices 706, link interface 704 forwards the read data command to memory hub controller 714 to be executed. Memory hub controller 714 converts the read data command into an appropriate format for attached memory devices 706. Memory hub controller 714 then sends the read data command to memory devices 706 over the memory device address and control bus 716.

Memory devices 706 then execute the read data command and transfer a read data packet to memory device data interface 710 over memory device data bus 712. Memory hub controller 714 uses internal bus 760 to send control signals to memory device data interface 710 so that memory device data interface 710 will transfer the read data packets to error correction logic 736. Error correction logic 736 checks the read data for errors, corrects the read data when possible, and then forwards the read data to either read data queue 728 or directly to multiplexer 750. From multiplexer 750 under control of memory hub controller 714 and write data flow selector 718, multiplexer 750 sends the read data to ECC generation logic 740. ECC generation logic 740 generates the ECC code data that is required by memory controller 732. Link interface 704 sends the ECC code data with the read data to memory controller 732 on memory channel 708.

For a write access request, memory hub device 702 operates in a similar manner to that described in FIG. 6 with regard to write access requests. However, since memory controller 732 is transmitting write data that includes ECC codewords and memory hub device 602 of FIG. 6 is expecting write data without ECC codewords, memory hub device 702 also comprises error correction logic 742. Error correction logic 742 receives write data that includes ECC codewords from memory controller 732. Error correction logic 742 checks the write data for errors using the ECC codewords. If error correction logic 742 detects and error in the write data that is correctable by the error correction code, error correction logic 742 corrects the write and forwards to the write data to write data queue 722 or sends the write data directly to multiplexer 740 via internal bus 724. If error correction logic 742 determines that the incoming write data is corrupted such that error correction logic 742 is not able to correct the write data, then error correction logic 742 stores the write data in write data queue 722 and tags the write data with a status bit that indicates that the write data is invalid due to a uncorrectable error.

Thus, while 72 bytes of data are still transferred to memory devices 706, error correction logic 742 reduces the write data down to the 64 bytes that would have been received if the ECC codewords were not transmitted with the write data. As described above with respect to ECC generation logic 634 of FIG. 6, ECC generation logic 734 generates a new more robust ECC code prior to writing the write data to memory devices 706. The new ECC code may take 76 bytes, 80 bytes, or more with the length depending on how much error coverage is desired.

Thus, the illustrative embodiments provide mechanisms for increasing the usable bandwidth and efficiency of a memory system. Some illustrative embodiments provides for supporting partial cache line read and write operations to a memory module to reduce read and write data traffic on a memory channel. Further illustrative embodiment provides for increasing the available bandwidth on the memory channel by managing memory device error correction within a memory hub device. Another illustrative embodiment provides additional error correction capability at the memory device level that is transparent to the memory channel.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A memory system, comprising:
   a memory hub device integrated in a memory module; and
   a set of memory devices coupled to the memory hub device, wherein the memory hub device comprises:
      burst logic integrated in the memory hub device, wherein the burst logic determines an amount of read data to be transmitted from the set of memory devices and generates a burst length field corresponding to the amount of read data; and
      a memory hub controller integrated in the memory hub device, wherein the memory hub controller controls the amount of read data that is transmitted using the burst length field and wherein the memory hub device transmits the amount of read data on a memory channel, wherein the amount of read data is equal to or less than a conventional data burst amount of data for the set of memory devices, wherein, in response to receiving a read access request, the memory hub controller forwards the read access request to the set of memory devices and, in response, receives a first portion of read data having an amount of data equal to the conventional data burst amount of data from the set of memory devices, and wherein the memory hub controller selects, based on the burst length field, a second portion of the read data having a smaller amount of data than the first portion of read data.

2. The memory system of claim 1, wherein the memory hub device further comprises:
   a memory device data interface coupled to the memory hub controller and the set of memory devices, wherein the memory hub controller controls the amount of read data that is transmitted using the burst length field by sending one or more control signals to the memory device data interface to thereby control an amount of data output by the memory device data interface.

3. The memory system of claim 2, wherein the memory hub device further comprises:
   a link interface, coupled to the memory device data interface and the memory hub controller, that provides a communication path between the memory module and an external memory controller, and wherein the memory hub controller controls the transfer of data between the memory device data interface and the link interface.

4. The memory system of claim 3, wherein the memory hub device further comprises:
   a multiplexer coupled to the link interface and the memory device data interface; and
   a read data queue coupled to the multiplexer and the memory device data interface, wherein the memory hub controller controls the transfer of data between the memory device data interface and the link interface by sending one or more control signals to the multiplexer to select either a direct input from the memory device data interface or an input from the read data queue for output by the multiplexer to the link interface.

5. The memory system of claim 4, wherein the memory hub controller controls the output of data from the link interface to the external memory controller by providing a control signal specifying an amount of data provided to the link interface, and a start of the data.

6. The memory system of claim 4, wherein the memory hub controller sends a control signal to the multiplexer to select the input from the read data queue based on a state of the read data queue and a state of the link interface.

7. The memory system of claim 1, wherein the burst length field specifies one of a full burst amount of data, a half burst amount of data, or a quarter burst amount of data.

8. The memory system of claim 1, wherein a smallest amount of read data that may be specified in the burst length field is dependent upon an error correction code codeword.

9. The memory system of claim 1, wherein the memory module is one of a dual in-line memory module (DIMM) or a single in-line memory module (SIMM).

10. The memory system of claim 1, wherein the memory module is part of a data processing device.

11. The memory system of claim 1, wherein the memory module is part of a main memory of a data processing system.

12. A data processing system, comprising:
   a processor; and
   a memory coupled to the processor, wherein the memory comprises one or more memory modules, and wherein each memory module of the one or more memory modules comprise:
      a memory hub device integrated in the memory module; and a set of memory devices coupled to the memory hub device, wherein the memory hub device comprises:

burst logic integrated in the memory hub device, wherein the burst logic determines an amount of read data to be transmitted from the set of memory devices and generates a burst length field corresponding to the amount of read data; and a memory hub controller integrated in the memory hub device, wherein the memory hub controller controls the amount of read data that is transmitted using the burst length field and wherein the memory hub device transmits the amount of read data on a memory channel, wherein the amount of read data is equal to or less than a conventional data burst amount of data for the set of memory devices, wherein, in response to receiving a read access request, the memory hub controller forwards the read access request to the set of memory devices and, in response, receives a first portion of read data having an amount of data equal to the conventional data burst amount of data from the set of memory devices, and wherein the memory hub controller selects, based on the burst length field, a second portion of the read data having a smaller amount of data than the first portion of read data.

13. The data processing system of claim 12, wherein the memory hub device further comprises:

a memory device data interface coupled to the memory hub controller and the set of memory devices, wherein the memory hub controller controls the amount of read data that is transmitted using the burst length field by sending one or more control signals to the memory device data interface to thereby control an amount of data output by the memory device data interface.

14. The data processing system of claim 13, wherein the memory hub device further comprises:

a link interface, coupled to the memory device data interface and the memory hub controller, that provides a communication path between the memory module and an external memory controller, and wherein the memory hub controller controls the transfer of data between the memory device data interface and the link interface.

15. The data processing system of claim 14, wherein the memory hub device further comprises:

a multiplexer coupled to the link interface and the memory device data interface; and a read data queue coupled to the multiplexer and the memory device data interface, wherein the memory hub controller controls the transfer of data between the memory device data interface and the link interface by sending one or more control signals to the multiplexer to select either a direct input from the memory device data interface or an input from the read data queue for output by the multiplexer to the link interface.

16. The data processing system of claim 15, wherein the memory hub controller controls the output of data from the link interface to the external memory controller by providing a control signal specifying an amount of data provided to the link interface, and a start of the data.

17. The data processing system of claim 15, wherein the memory hub controller sends a control signal to the multiplexer to select the input from the read data queue based on a state of the read data queue and a state of the link interface.

18. The data processing system of claim 12 wherein the burst length field specifies one of a full burst amount of data, a half burst amount of data, or a quarter burst amount of data.

19. The data processing system of claim 12, wherein a smallest amount of read data that may be specified in the burst length field is dependent upon an error correction code codeword.

* * * * *